United States Patent
Lai et al.

(10) Patent No.: US 11,785,204 B1
(45) Date of Patent: Oct. 10, 2023

(54) FREQUENCY DOMAIN MODE DECISION FOR JOINT CHROMA CODING

(71) Applicant: MediaTek Inc., Hsinchu (TW)

(72) Inventors: Chen-Yen Lai, Hsinchu (TW);
Tzu-Der Chuang, Hsinchu (TW);
Ching-Yeh Chen, Hsinchu (TW);
Chih-Wei Hsu, Hsinchu (TW);
Chun-Chia Chen, Hsinchu (TW);
Yu-Wen Huang, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 17/842,510

(22) Filed: Jun. 16, 2022

(51) Int. Cl.
| | |
|---|---|
| *H04N 19/103* | (2014.01) |
| *H04N 19/154* | (2014.01) |
| *H04N 19/30* | (2014.01) |
| *H04N 19/176* | (2014.01) |
| *H04N 19/12* | (2014.01) |

(52) U.S. Cl.
CPC ........... *H04N 19/103* (2014.11); *H04N 19/12* (2014.11); *H04N 19/154* (2014.11); *H04N 19/176* (2014.11); *H04N 19/30* (2014.11)

(58) Field of Classification Search
CPC .... H04N 19/103; H04N 19/12; H04N 19/154; H04N 19/176; H04N 19/30
See application file for complete search history.

(56) References Cited

U.S. PATENT DOCUMENTS

| 11,270,468 B1 * | 3/2022 | Chang .................. H04N 19/176 |
| 2020/0077090 A1 * | 3/2020 | Wennersten ........... H04N 19/80 |

* cited by examiner

*Primary Examiner* — Jae N Noh
(74) *Attorney, Agent, or Firm* — Han IP PLLC; Andy M. Han

(57) ABSTRACT

Various schemes for realizing JCCR mode decision in frequency domain are described. An apparatus receives first and second pixel data of a current block of a picture and transform the pixel data into first and second transformed data in frequency domain. The apparatus generates joint pixel data comprising a pixelwise linear combination of the first and second transformed data. The apparatus generates reconstructed joint pixel data based on the joint pixel data by quantization and inverse quantization operations. The apparatus derives first and second reconstructed pixel data based on the reconstructed joint pixel data. The apparatus accordingly calculates first and second distortion values in frequency domain, based on which a preferred mode may be determined to code the current block.

20 Claims, 13 Drawing Sheets

FREQUENCY DOMAIN MODE DECISION FOR JOINT CHROMA CODING

TECHNICAL FIELD

The present disclosure is generally related to video coding and, more particularly, to methods and apparatus for determining a joint chroma coding mode based on data in the frequency domain.

BACKGROUND

Unless otherwise indicated herein, approaches described in this section are not prior art to the claims listed below and are not admitted as prior art by inclusion in this section.

Video coding generally involves encoding a digital video into a bitstream by an encoder, transmitting the bitstream to a decoder, and decoding the video from the bitstream by the decoder parsing and processing the bitstream to produce a reconstructed video. A video consists of a series of pictures arranged in a time sequence. Each pixel of a picture may be represented by a luma component, often referred to as the Y component, as well as two chroma components, often referred to as the Cb and Cr components. Namely, each picture may be represented by a luma frame (i.e., a Y frame) and two chroma frames (i.e., a Cb frame and a Cr frame); the Y frame contains luminance information (i.e., a specific shade of light) of the video picture, whereas the Cb and Cr frames contain chromatic information (i.e., a specific hue of color) of the video picture. It follows that, to encode a picture of the video into the bitstream, the encoder is required to encode each of the Y, Cb and Cr frames of the picture into the bitstream.

The main purpose of coding a video is to reduce a total size of the bitstream that needs to be transmitted to the decoder while still providing the decoder enough information about the original video such that a reconstructed video that is satisfactorily faithful to the original video can be generated by the decoder. Various coding modes (or "coding tools") may be employed by the encoder and the decoder to achieve this purpose by removing redundancy in the video, whereas a majority of the coding tools are based on the widely used intra-picture prediction and/or inter-picture prediction techniques. The intra-picture prediction techniques aim to remove spatial redundancy in the video pictures, whereas the inter-picture prediction techniques aim to remove temporal redundancy in the video pictures. The prediction techniques, regardless of being inter-picture or intra-picture, utilize information in already-decoded pictures as "predictors" such that every pixel to be coded can be represented by a predicted value plus a residual, wherein the residual is the difference between the predicted value and the actual pixel value of the respective pixel. The encoder is then only required to encode the residual into the bitstream, and the decoder is only required to decode the residual from the bitstream, as the predictor information can be extracted from the already-decoded pictures by the decoder. The prediction techniques may be applied to each of the Y, Cb and Cr frames of the picture being coded such that only residual information of each of the Y, Cb and Cr frames is encoded into the bitstream.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to joint chroma coding mode, also referred to as joint coding of chroma residuals (JCCR). It is believed that with the various embodiments in the present disclosure, benefits including reduced hardware overhead, improved coding latency, and/or higher coding throughput are achieved.

In one aspect, a method is presented for processing a current block of a picture of a video. The method may involve receiving first pixel data and second pixel data, whereas each of the first and second pixel data comprises data of the current block in a spatial domain. In some embodiments, the first pixel data may include residual data of a first chroma component (e.g., residual of the Cb component) of the current block, whereas the second pixel data may include residual data of a second chroma component (e.g., residual of the Cr component) of the current block. The method may also involve transforming the first pixel data to first transformed data and the second pixel data to second transformed data. Each of the first and second transformed data may comprise data in a frequency domain. The method may also involve generating joint pixel data, wherein the joint pixel data comprises a pixelwise linear combination of the first and second transformed data. The method may also involve generating reconstructed joint pixel data in the frequency domain based on the joint pixel data. Specifically, to result in the reconstructed joint pixel data, the joint pixel data is firstly quantized by a quantization operation, and then secondly de-quantized by an inverse quantization operation. The method may also involve deriving first reconstructed pixel data and second reconstructed pixel data based on the reconstructed joint pixel data. Each of the first and second reconstructed pixel data comprises data in the frequency domain. The method may also involve calculating a first distortion value based on the first transformed data and the first reconstructed pixel data. The method may also involve calculating a second distortion value based on the second transformed data and the second reconstructed pixel data.

In some embodiments, the method may further involve generating third reconstructed pixel data based on the first transformed data. This may be done by performing the quantization operation on the first transformed data followed by the inverse quantization operation. The method may also involve generating fourth reconstructed pixel data based on the second transformed data by the quantization operation followed by the inverse quantization operation. The method may also involve calculating a third distortion value based on the first transformed data and the third reconstructed pixel data, as well as a fourth distortion value based on the second transformed data and the fourth reconstructed pixel data.

In some embodiments, the method may further involve determining a preferred coding mode by comparing a sum of the first and second distortion values and a sum of the third and fourth distortion values. The method may also involve coding the current block using the preferred coding mode.

In another aspect, an apparatus is presented which includes a transform module, a scaling module, a quantization module, an inverse quantization module, and a distortion evaluation module. The transform module is configured to transform first pixel data in a spatial domain to first transformed data in a frequency domain. The transform module is also configured to transform second pixel data in the spatial domain to second transformed data in the frequency domain. The scaling module is configured to generate joint pixel data comprising a pixelwise linear combination of the first and second transformed data. The pixelwise linear combination of the first and second transformed data may be a sum of the first transformed data multiplied by a first scaling factor and the second transformed data multiplied by a second scaling factor. The quantization module is configured to quantize the joint pixel data into quantized joint pixel data. The inverse quantization module is configured to de-quantize the quantized joint pixel data into reconstructed joint pixel data. The inverse scaling module is configured to derive first reconstructed pixel data and second reconstructed pixel data based on the reconstructed joint pixel data. The first reconstructed pixel data may be the reconstructed joint pixel data multiplied by a third scaling factor, whereas the second reconstructed pixel data may be the reconstructed joint pixel data multiplied by a fourth scaling factor. Finally, the distortion evaluation module is configured to calculate a first distortion value and a second distortion value, wherein the first distortion value is calculated based on the first transformed data and the first reconstructed pixel data, and wherein the second distortion value is calculated based on the second transformed data and the second reconstructed pixel data.

In some embodiments, the quantization module is further configured to quantize the first transformed pixel data into first transformed-and-quantized pixel data. The quantization module is also configured to quantize the second transformed pixel data into second transformed-and-quantized pixel data. Moreover, the inverse quantization module is further configured to de-quantize the first transformed-and-quantized pixel data into third reconstructed pixel data. The inverse quantization module is also configured to de-quantize and the second transformed-and-quantized pixel data into fourth reconstructed pixel data. Furthermore, the distortion evaluation module is further configured to calculate a third distortion value based on the first transformed data and the third reconstructed pixel data. The distortion evaluation module is also configured to calculate a fourth distortion value based on the second transformed data and the fourth reconstructed pixel data.

In some embodiments, the distortion evaluation module is further configured to determine a preferred coding mode. The preferred coding mode is determined by the distortion evaluation module comparing a sum of the first and second distortion values and a sum of the third and fourth distortion values.

In some embodiments, the apparatus may further include a preselection module that is configured to determine values of the first, second, third and fourth scaling factors. Specifically, the preselection module may select a preferred sub-mode among a plurality of predefined sub-modes, wherein each of the plurality of predefined sub-modes defines a respective set of values of the first, second, third and fourth scaling factors.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Implementations in accordance with the present disclosure relate to various techniques, methods, schemes and/or solutions pertaining to realizing joint coding of chroma residuals (JCCR) for a video encoder or decoder. According to the present disclosure, a number of possible solutions may be implemented separately or jointly. That is, although these possible solutions may be described below separately, two or more of these possible solutions may be implemented in one combination or another.

As described elsewhere herein above, to encode a video picture (i.e., a picture of a video) into a bitstream, an encoder is required to encode each of the Y, Cb and Cr frames of the video picture into the bitstream, whereas a decoder is required to parse the bitstream to decode or otherwise reconstruct each of the Y, Cb and Cr frames. Specifically, the encoder may employ various intra-prediction or inter-prediction techniques to encode residual of each of the Y, Cb and Cr frames into the bitstream, and the decoder would decode from the bitstream the residual of each of the Y, Cb and Cr frames. Moreover, the encoder and the decoder may process the pixel data of the video in a block-based fashion. Namely, each video picture may be divided into multiple blocks, i.e., rectangular, non-overlapping areas, and each of the encoder and the decoder may process the video picture by processing the blocks sequentially. Each of the non-overlapping blocks may be referred to as a "coding block".

Figure 1:
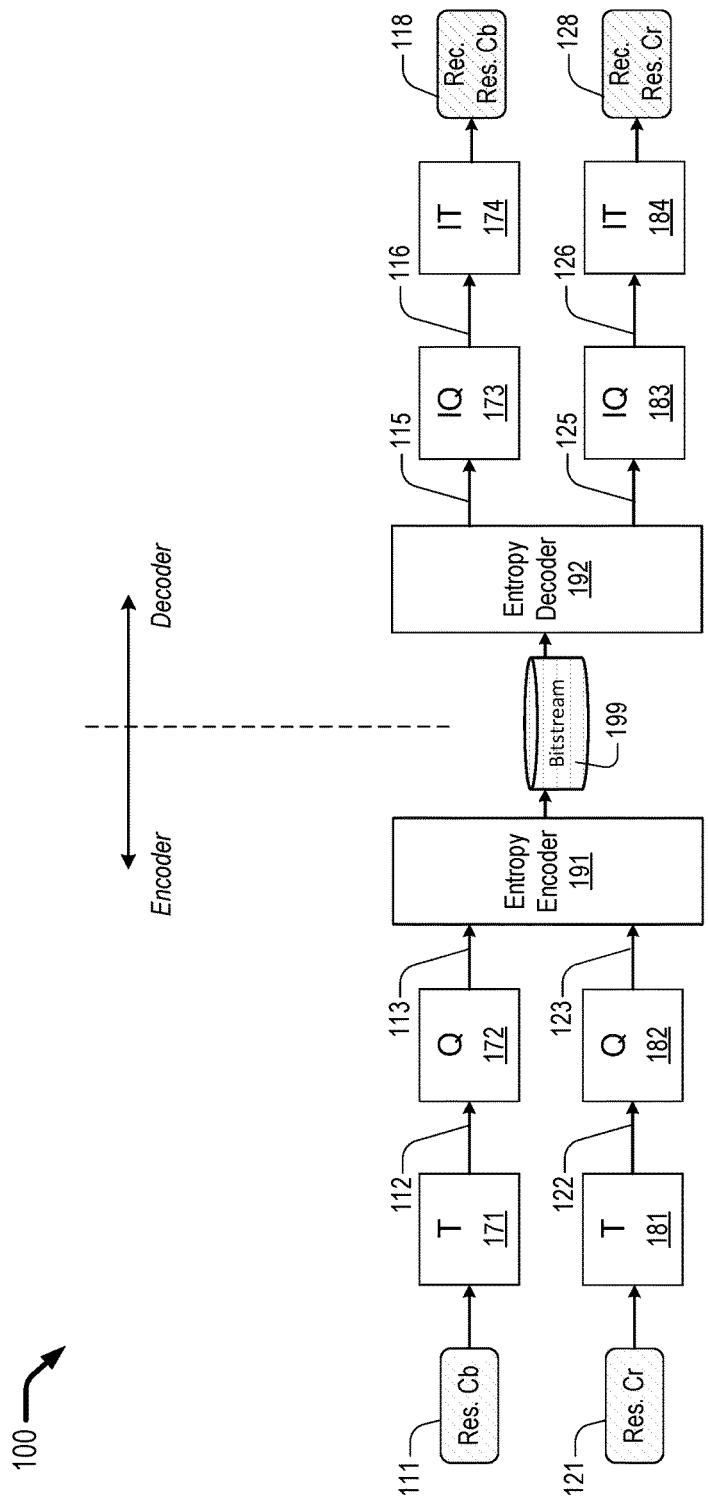
FIG. 1 is a diagram of an example design in accordance with an implementation of the present disclosure.

FIG. 1 is a diagram of an example design in accordance with an implementation of the present disclosure, wherein a chroma coding scheme 100 is illustrated. In the chroma coding scheme 100, a Cb residual 111 (i.e., the residual of a coding block in a Cb frame) and a Cr residual 121 (i.e., the residual of the coding block in a Cr frame) are encoded into bitstream 199 by an encoder. On the decoding side, a decoder parses the bitstream 199 and reconstructs the Cb residual and the Cr residual, which are represented by a reconstructed Cb residual 118 and a reconstructed Cr residual 128, respectively. The reconstructed Cb and Cr residuals 118 and 128 are very close to the Cb and Cr residuals 111 and 121, respectively, although they may not be identical to the Cb and Cr residuals 111 and 121 due to various coding operations performed by the encoder and the decoder. Specifically, the encoder includes transform modules 171 and 181, each of which is configured to perform a transform operation, as well as quantization modules 172 and 182, each of which is configured to perform a quantization operation. The transform modules 171 and 181 may be identical and perform the transform operation by respectively converting the Cb residual 111 and the Cr residual 121, which are in spatial domain, to transform coefficients 112 and transform coefficients 122, which are in frequency domain, using algorithms such as Discrete Cosine Transform (DCT) or Discrete Cosine Transform Type II (DCT-2). The quantization modules 172 and 182 may be identical and perform the quantization operation by quantizing the transform coefficients 112 and 122 into quantized coefficients 113 and quantized coefficients 123, respectively. The quantized coefficients 113 and 114 are subsequently encoded into the bitstream 199 by an entropy encoder 191 using entropy-coding techniques such as context-adaptive binary arithmetic coding (CABAC) or Huffman coding.

On the decoding side, the decoder includes an entropy decoder 192 that is configured to parse the bitstream 199 and extract quantized coefficients 115 and 125, which are substantially identical to the quantized coefficients 113 and 123, using entropy-coding techniques such as CABAC or Huffman coding. The decoder also includes inverse quantization modules 173 and 183, each of which is configured to perform an inverse quantization operation, as well as inverse transform modules 174 and 184, each of which is configured to perform an inverse transform operation. The inverse quantization modules 173 and 183 may be identical and perform the inverse quantization operation by de-quantizing the quantized coefficients 115 and 125 to obtain transform coefficients 116 and 126, respectively. The inverse transform modules 174 and 184 may be identical and respectively perform the inverse transform operation on the transform coefficients 116 and 126, which are in frequency domain, to produce the reconstructed Cb residual 118 and the reconstructed Cr residual 128, which are in spatial domain.

I. Joint Coding of Chroma Residuals (JCCR)

As shown above, the chroma coding scheme 100 processes the chroma residuals of the coding block (i.e., the Cb residual 111 and the Cr residual 121) using two identical, parallel pipelines, one pipeline consisting of the modules 171, 172, 191, 192, 173 and 174, the other pipeline consisting of the modules 181, 182, 191, 192, 183 and 184. According to an aspect of the present disclosure, the chroma residuals may be processed using only one pipeline instead of two, as described below, thereby reducing the required hardware and/or software resources. The resource reduction is achieved by employing a joint chroma coding mode, i.e., joint coding of chroma residuals (JCCR), as described below.

Figure 2:
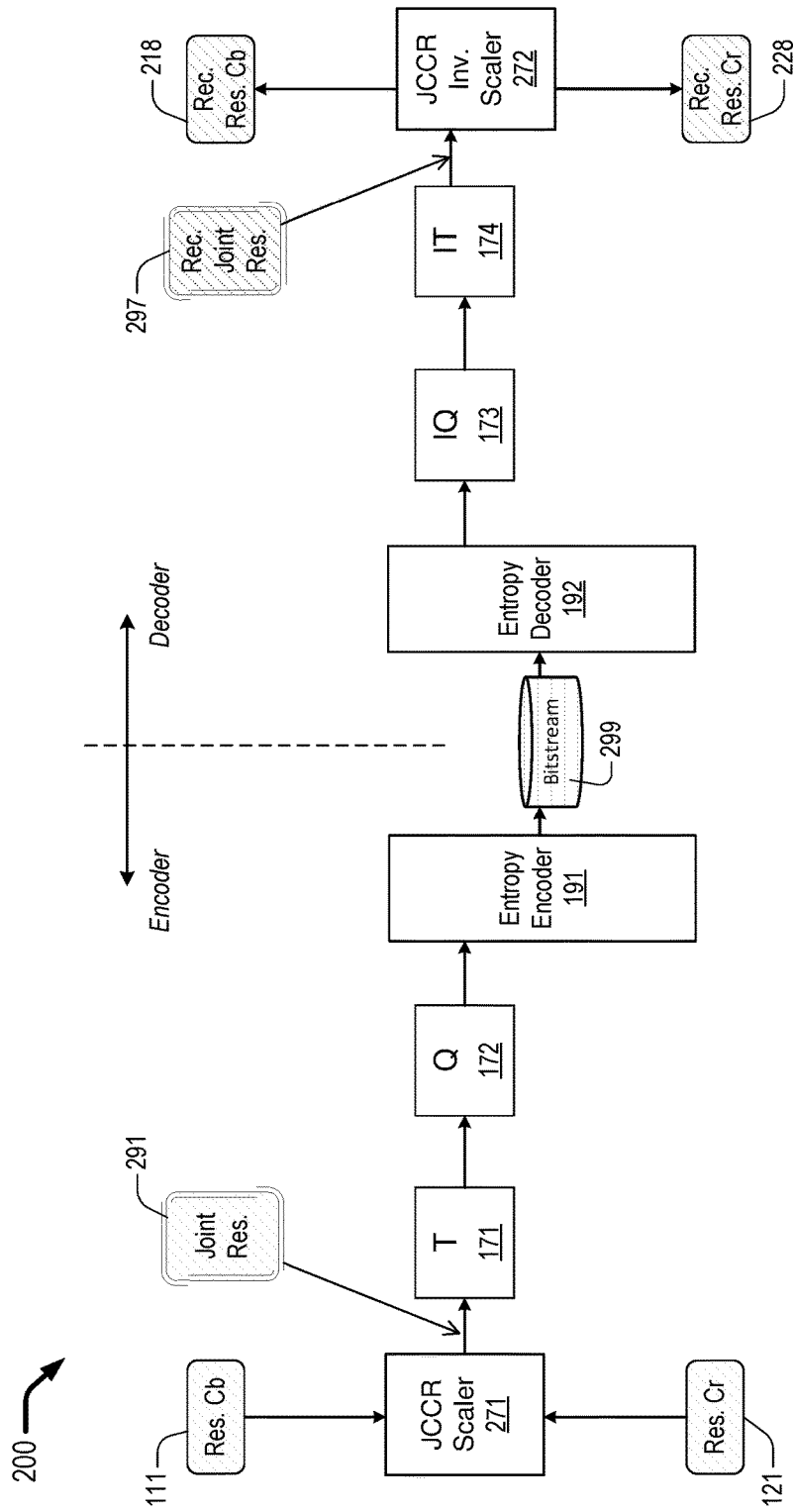
FIG. 2 is a diagram of an example design in accordance with an implementation of the present disclosure.

FIG. 2 is a diagram of an example design in accordance with an implementation of the present disclosure, wherein a chroma coding scheme 200 employing JCCR is illustrated. In the chroma coding scheme 200, only one pipeline, consisting of the modules 171, 172, 191, 192, 173 and 174, is involved in coding the Cb residual 111 and the Cr residual 121. Specifically, the chroma coding scheme 200 employs in the encoder a JCCR scaler 271 that is configured to generate a joint residual 291 based on the Cb residual 111 and the Cr residual 121. The joint residual 291 is fed to the pipeline (i.e., the combination of the modules 171, 172, 191, 192, 173 and 174), resulting in a reconstructed joint residual 297 on the decoder's side. The decoder includes a JCCR inverse scaler 272 that is configured to generate a reconstructed Cb residual 218 and a reconstructed Cr residual 228 based on the reconstructed joint residual 297. The reconstructed Cb residual 218 and the reconstructed Cr residual 228, though not identical to the reconstructed Cb residual 118 and the reconstructed Cr residual 128, are close to the reconstructed Cb residual 118 and the reconstructed Cr residual 128, respectively, and thus sufficient for the decoder to reconstruct the original video picture or a block thereof.

Specifically, the JCCR scaler 271 is configured to generate the joint residual 291 by designating a pixelwise linear combination of the Cb residual 111 and the Cr residual 121 as the joint residual 291. For example, the joint residual 291 may be represented by Equation (1) below:

$$(\text{Jt. Res.}291) = wt\_Cb \times (\text{Res. } Cb111) + wt\_Cr \times (\text{Res. } Cr121) \quad (1),$$

wherein wt_Cb is a real number representing a weight or scaling factor for the Cb residual 111, and wherein wt_Cr is a real number representing a weight or scaling factor for the Cr residual 121. It is worth noting that Equation (1) is applied to each pixel of the coding block. Namely, in generating the joint residual 291 for the current block, the JCCR scaler 271 uses same values of the scaling factors wt_Cb and wt_Cr for each pixel of the current block.

On the other hand, JCCR inverse scaler 272 is configured to derive the reconstructed Cb residual 218 and the reconstructed Cr residual 228 from the reconstructed joint residual 297. Specifically, the JCCR inverse scaler 272 is configured to generate the reconstructed Cb residual 218 and the reconstructed Cr residual 228 by multiplying a respective scaling factor to the reconstructed joint residual 297. For example, the reconstructed Cb residual 218 and the reconstructed Cr residual 228 may be represented by Equations (2) and (3) below:

$$\text{Rec. Res. } Cb218 = wt\_i\_Cb \times (\text{Rec. Jt. Res.}297) \quad (2)$$

and $$\text{Rec. Res. } Cr228 = wt\_i\_Cr \times (\text{Rec. Jt. Res.}297) \quad (3),$$

wherein $wt\_i\_Cb$ is a real number representing a scaling factor that is multiplied with the reconstructed joint residual 297 to generate the reconstructed Cb residual 218, and wherein $wt\_i\_Cr$ is a real number representing a scaling factor that is multiplied with the reconstructed joint residual 297 to generate the reconstructed Cr residual 228. In some embodiments, the values of the scaling factors $wt\_i\_Cb$ and $wt\_i\_Cr$ may be dependent on the values of $wt\_Cb$ and/or $wt\_Cr$ of Equation (1). Same as Equation (1) being a block-level operation, Equations (2) and (3) are applied to each pixel of the reconstructed joint residual 297. Namely, in deriving the reconstructed Cb residual 218 and the reconstructed Cr residual 228, the JCCR inverse scaler 272 uses same values of the scaling factors $wt\_i\_Cb$ and $wt\_i\_Cr$ for each pixel of the current block.

Accordingly, the chroma coding scheme 200 may be used to realize various JCCR modes depending on the values of the parameters $wt\_Cb$, $wt\_Cr$, $wt\_i\_Cb$ and $wt\_i\_Cr$. For example, a JCCR mode, referred to hereinafter as "JCCR sub-mode 1", may be defined by Equation (4) below:

$$wt\_Cb=0.8, wt\_Cr=0.4*CSign, wt\_i\_Cb=1.0, \text{ and } wt\_i\_Cr=0.5*CSign \quad (4)$$

Also, a JCCR mode, referred to hereinafter as "JCCR sub-mode 2", may be defined by Equation (5) below:

$$wt\_Cb=0.5, wt\_Cr=0.5*CSign, wt\_i\_Cb=1.0, \text{ and } wt\_i\_Cr=1.0*CSign \quad (5)$$

In addition, a JCCR mode, referred to hereinafter as "JCCR sub-mode 3" may be defined by Equation (6) below:

$$wt\_Cb=0.4*CSign, wt\_Cr=0.8, wt\_i\_Cb=0.5*CSign, \text{ and } wt\_i\_Cr=1.0 \quad (6)$$

In each of Equations (4)-(6), the parameter CSign is either +1 or −1 as determined by the encoder and signaled to the decoder in a slice header of bitstream 299.

II. JCCR Mode Decision

Figure 3:
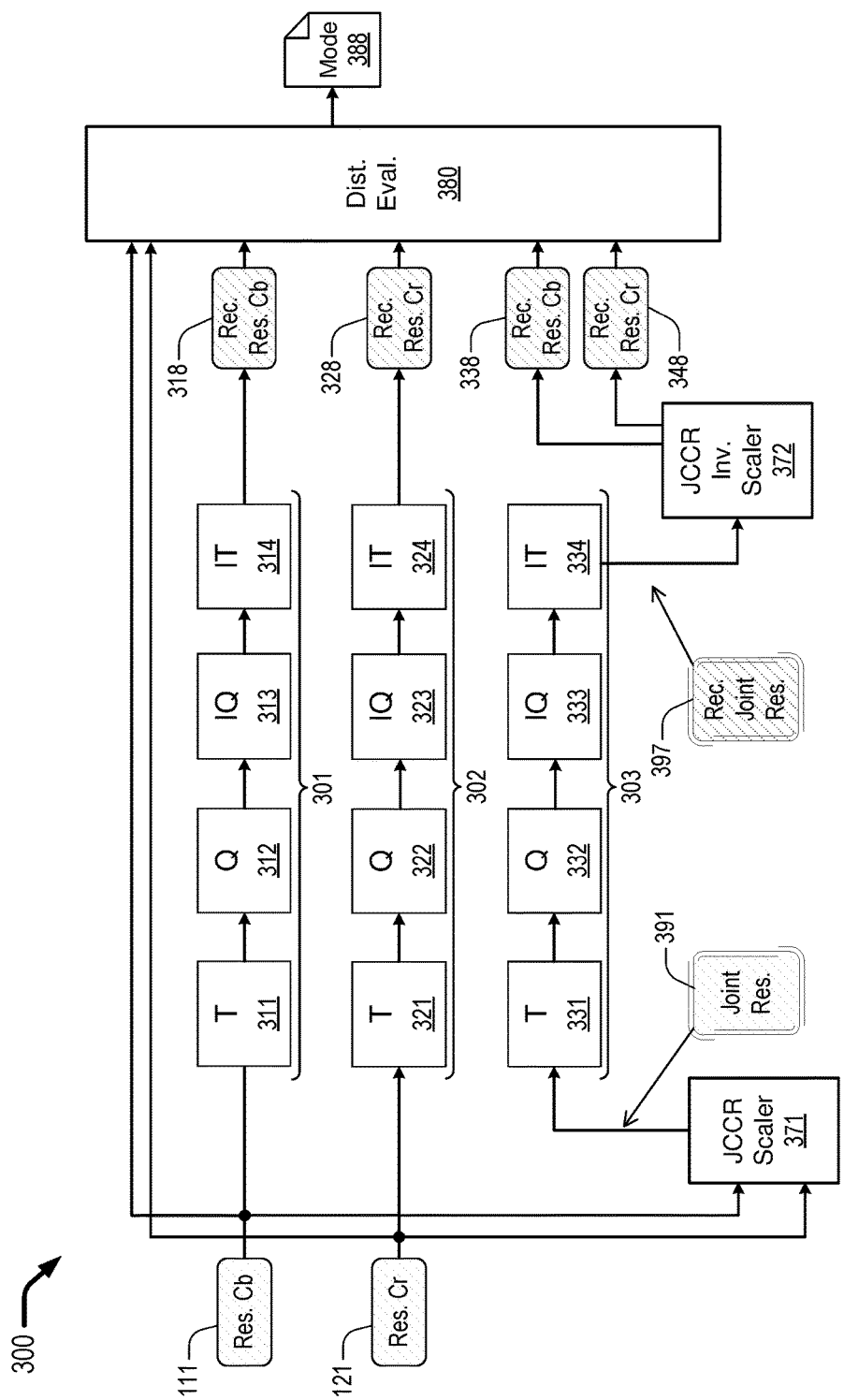
FIG. 3 is a diagram of an example design in accordance with an implementation of the present disclosure.

In some embodiments, a video encoder may be capable of coding video pictures both with and without a JCCR mode. Accordingly, the encoder is required to determine, for each coding block to be coded, whether to turn the JCCR mode on or off. That is, for an immediate coding block to be coded (i.e., the "current block"), the encoder must decide whether to code the current block using the chroma coding scheme 100 or the chroma coding scheme 200. FIG. 3 is a diagram of an example design in accordance with an implementation of the present disclosure, wherein a JCCR mode decision module 300 is illustrated. The mode decision module 300 may be included in the encoder to determine whether or not a JCCR mode would preferably be activated for encoding a block. Specifically, the mode decision module 300 is configured to simulate or otherwise estimate distortion that would be introduced in the chroma residuals during encoding and decoding the current block with the JCCR mode turned on, as well as with the JCCR mode turned off. In an event that the estimated distortion with the JCCR mode being turned off is superior (i.e., lower) than the estimated distortion with the JCCR mode being turned on, the JCCR mode decision module 300 would determine a preferred mode 388 to be the "JCCR off" mode (i.e., the JCCR mode being turned off), and the current block would thus be coded using the preferred mode 388, i.e., according to the chroma coding scheme 100. In an event that the estimated distortion with the JCCR mode being turned on is superior (i.e., lower) than the estimated distortion with the JCCR mode being turned off, the JCCR mode decision module 300 would determine the preferred mode 388 to be the "JCCR on" mode (i.e., the JCCR mode being turned on), and the current block would thus be coded using the preferred mode 388, i.e., according to the chroma coding scheme 200.

As shown in FIG. 3, the mode decision module 300 has three pipelines 301, 302 and 303 that operate in parallel, the pipeline 301 consisting of blocks 311-314, the pipeline 302 consisting of blocks 321-324, the pipeline 303 consisting of blocks 331-334. Each of the blocks 311, 321 and 331 is a transform module configured to perform same or similar functions as each of the transform modules 171 and 181. Each of the blocks 312, 322 and 332 is a quantization module configured to perform same or similar functions as each of the quantization modules 172 and 182. Each of the blocks 313, 323 and 333 is an inverse quantization module configured to perform same or similar functions as each of the inverse quantization modules 173 and 183. Each of the blocks 314, 324 and 334 is an inverse transform module configured to perform same or similar functions as each of the inverse transform modules 174 and 184.

Moreover, the mode decision module 300 also includes a JCCR scaler 371 and a JCCR inverse scaler 372. The JCCR scaler 371 may be identical to the JCCR scaler 271, whereas the JCCR inverse scaler 372 may be identical to the JCCR inverse scaler 272. It follows that a joint residual 391 generated by the JCCR scaler 371 based on the Cb residual 111 and the Cr residual 121 may be identical to the joint residual 291.

The mode decision module 300 employs the pipelines 301 and 302 to simulate the "JCCR off" mode. Specifically, the pipeline 301 is configured to generate a reconstructed Cb residual 318 based on the Cb residual 111, whereas the pipeline 302 is configured to generate a reconstructed Cr residual 328 based on the Cr residual 121. Given similarity between the pipeline 301 and the combination of the blocks 171-174, the reconstructed Cb residual 318 is a close estimate for the reconstructed Cb residual 118. Likewise, given similarity between the pipeline 302 and the combination of the blocks 181-184, the reconstructed Cb residual 328 is a close estimate for the reconstructed Cb residual 128.

Furthermore, the mode decision module 300 employs the pipeline 303 to simulate the "JCCR on" mode. Specifically, the pipeline 303 is configured to generate a reconstructed joint residual 397 based on the joint residual 391 generated by the JCCR scaler 371. Given similarity between the pipeline 303 and the combination of the blocks 171-174, the reconstructed joint residual 397 is a close estimate for the reconstructed joint residual 297. It follows that a reconstructed Cb residual 338 and a reconstructed Cr residual 348, which are generated by the JCCR inverse scaler 372 based on the reconstructed joint residual 397, are close estimates for the reconstructed Cb residual 218 and the reconstructed Cr residual 228, respectively.

The mode decision module 300 further includes a distortion evaluation module 380, which is configured to calculate a JCCR-off distortion value and a JCCR-on distortion value. The distortion evaluation module 380 computes the JCCR-off distortion using the Equation (7) below:

$$\text{JCCR-off distortion} = \text{JCCR\_off\_Cb\_dist} + \text{JCCR\_off\_Cr\_dist} \quad (7)$$

In Equation (7), JCCR_off_Cb_dist represents the distortion (i.e., the difference) between the Cb residual 111 and the reconstructed Cb residual 318, whereas JCCR_off_Cr_dist represents the distortion between the Cr residual 121 and the reconstructed Cr residual 328. Likewise, the distortion evaluation module 380 computes the JCCR-on distortion using the Equation (8) below:

$$\text{JCCR-on distortion} = \text{JCCR\_on\_Cb\_dist} + \text{JCCR\_on\_Cr\_dist} \quad (8)$$

In Equation (8), JCCR_on_Cb_dist represents the distortion between the Cb residual 111 and the reconstructed Cb residual 338, whereas JCCR_on_Cr_dist represents the distortion between the Cr residual 121 and the reconstructed Cr residual 348. Each of JCCR_off_Cb_dist, JCCR_off_Cr_dist, JCCR_on_Cb_dist and JCCR_on_Cr_dist in Equations (7) and (8) may be computed using a block-level figure of merit, such as a sum of squared differences (SSD) or a sum of absolute differences (SAD), that is calculated across every pixel of the current block.

In some embodiments, the distortion evaluation module 380 may accordingly determine the preferred mode 388. That is, the distortion evaluation module 380 may compare the JCCR-off distortion with JCCR-on distortion and determine the preferred mode 388 accordingly. Specifically, in an event that the JCCR-off distortion as computed using Equation (7) is higher than the JCCR-on distortion as computed using Equation (8), the distortion evaluation module 380 may determine the preferred mode 388 to be the "JCCR on" mode. In contrast, in an event that the JCCR-off distortion as computed using Equation (7) is not higher than the JCCR-on distortion as computed using Equation (8), the distortion evaluation module 380 may determine the preferred mode 388 to be the "JCCR off" mode.

Figure 4:
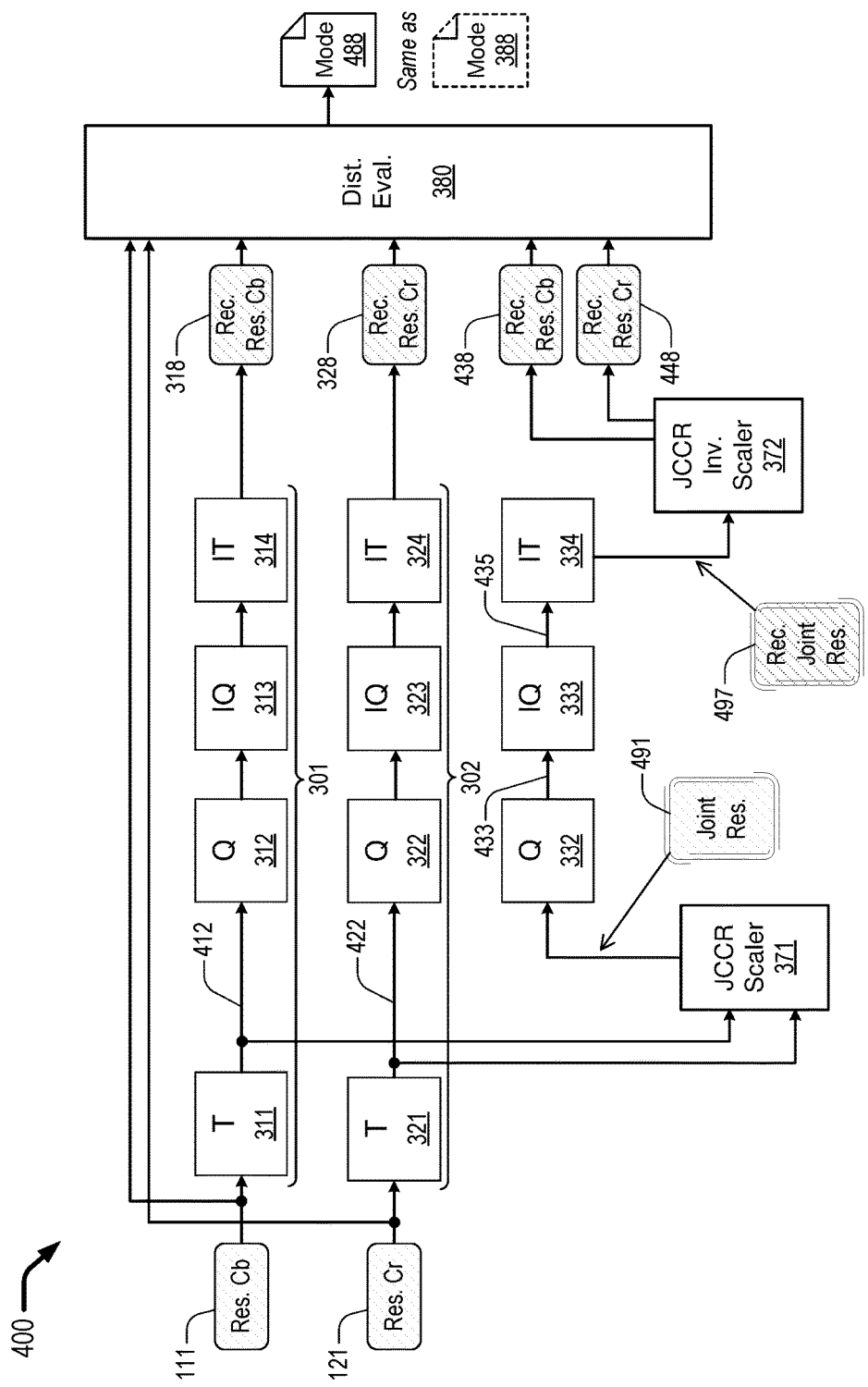
FIG. 4 is a diagram of an example design in accordance with an implementation of the present disclosure.

FIG. 4 is a diagram of an example design in accordance with an implementation of the present disclosure, wherein a JCCR mode decision module 400 is illustrated. The mode decision module 400 is aimed at achieving the same purpose as the mode decision module 300, namely, deciding whether or not to use a JCCR mode for encoding a block of a picture. The mode decision module 400 simulates the "JCCR off" mode in the same way as the mode decision module 300, i.e., by processing the Cb residual 111 and the Cr residual 121 through every stage of the pipelines 301 and 302, respectively. However, the mode decision module 400 simulates the "JCCR on" mode in a different way as compared to the mode decision module 300. The mode decision module 400 has the same blocks or modules as those of the mode decision module 300 except for the transform module 331. Also, the mode decision module 400 uses a different set of inputs for the JCCR scaler 371 as compared to the mode decision module 300. Specifically, in the mode decision module 400, the JCCR scaler 371 receives a transformed Cb residual 412 and a transformed Cr residual 422 as inputs, rather than the Cb residual 111 and the Cr residual 121 as in FIG. 3. As shown in FIG. 4, the transformed Cb residual 412 is generated by the transform module 311 performing a transform operation (e.g., DCT or DCT-2) on the Cb residual 111, whereas the transformed Cr residual 422 is generated by the transform module 321 performing the transform operation on the Cr residual 121. Therefore, while the Cb residual 111 and the Cr residual 121 are in the spatial domain, the transformed Cb residual 412 and the transformed Cr residual 422 are in the frequency domain. It follows that a joint residual 491, generated by the JCCR scaler 371 based on the transformed Cb residual 412 and the transformed Cr residual 422 using a linear operation analogue to Equation (1), is also in the frequency domain. The joint residual 491 remains in the frequency domain as pixel data 433 after passing through the quantization module 332, and as pixel data 435 after passing further through the inverse quantization module 333. The joint residual 491 is subsequently transformed back to the spatial domain as a reconstructed joint residual 497 by the inverse transform module 334. The JCCR inverse scaler 372 then derives a reconstructed Cb residual 438 and a reconstructed Cr residual 448 based on the reconstructed joint residual 497 using scaling operation analogues to Equations (2) and (3). Specifically, the JCCR scaler 371 of FIG. 4 is configured to generate the joint residual 491 using Equation (9) below:

$$(\text{Jt. Res.}491) = wt\_Cb \times (\text{Trans. Res. } Cb412) + wt\_Cr \times (\text{Trans. Res. } Cr422) \qquad (9).$$

wherein wt_Cb is a real number representing a weight or scaling factor for the transformed Cb residual 412, wt_Cr is a real number representing a weight or scaling factor for the transformed Cr residual 422. It is worth noting that Equation (9) is applied to each pixel of the coding block. Namely, in generating the joint residual 491 for the current block, the JCCR scaler 371 uses same values of the scaling factors wt_Cb and wt_Cr for each pixel of the current block. Also, the JCCR inverse scaler 372 of FIG. 4 is configured to generate the reconstructed Cb residual 438 and the reconstructed Cr residual 448 using Equations (10) and (11) below:

$$\text{Rec. Res. } Cb438 = wt\_i\_Cb \times (\text{Rec. Jt. Res.}497) \qquad (10)$$

and $$\text{Rec. Res. } Cr448 = wt\_i\_Cr \times (\text{Rec. Jt. Res.}497) \qquad (11),$$

wherein wt_i_Cb is a real number representing a scaling factor that is multiplied with the reconstructed joint residual 497 to generate the reconstructed Cb residual 438, and wt_i_Cr is a real number representing a scaling factor that is multiplied with the reconstructed joint residual 497 to generate the reconstructed Cr residual 448. The values of the scaling factors wt_i_Cb and wt_i_Cr may be dependent on the values of wt_Cb and/or wt_Cr of Equation (9). Same as Equation (9) being a block-level operation, Equations (10) and (11) are applied to each pixel of the reconstructed joint residual 497. Namely, in deriving the reconstructed Cb residual 438 and the reconstructed Cr residual 448, the JCCR inverse scaler 372 uses same values of the scaling factors wt_i_Cb and wt_i_Cr for each pixel of the current block.

As in the mode decision module 300, the distortion evaluation module 380 of the mode decision module 400 is also configured to calculate a JCCR-off distortion value and a JCCR-on distortion value based on the Equations (7) and (8), respectively. Given that the mode decision module 400 simulates the "JCCR off" mode in the same way as the mode decision module 300 (i.e., through every stage of the pipelines 301 and 302), the computation of the JCCR-off distortion value is identical in both the mode decision module 300 and the mode decision module 400. However, since the mode decision module 400 simulates the "JCCR on" mode differently from the mode decision module 300, as described above, the computation of the JCCR-on distortion value is slightly different. Specifically, for the mode decision module 400, JCCR_on_Cb_dist in Equation (8) represents the difference between the Cb residual 111 and the reconstructed Cb residual 438, whereas JCCR_on_Cr_dist represents the difference between the Cr residual 121 and the reconstructed Cr residual 448. Both the JCCR-off distortion value and the JCCR-on distortion value are computed in the spatial domain as in the case of the mode decision module 300. The distortion evaluation module 380 further determines a preferred mode 488 based on the JCCR-off distortion value and the JCCR-on distortion value in a same way as the preferred mode 388 is determined.

Accordingly, an essential difference between the mode decision module 300 and the mode decision module 400 is that in the mode decision module 300 the JCCR scaler 371 precedes a transform operation (which is performed by the transform module 331), whereas in the mode decision module 400 the JCCR scaler 371 succeeds a transform operation (which is performed by the transform modules 311 and 321). Given the difference, the joint residual 491 is not identical to the joint residual 391, and thus the reconstructed joint residual 497 is not identical to the reconstructed joint residual 397. Nevertheless, though not identical, the joint residual 491 and the joint residual 391 have little difference. This is because both the transform operation (e.g., DCT or DCT-2) the JCCR scaling operation described in Equation (1) are substantially linear operations. Therefore, little difference is introduced when the two operations swap processing orders. It follows that little difference exists between reconstructed joint residual 397 and the reconstructed joint residual 497, between the reconstructed Cb residual 338 and the reconstructed Cb residual 438, and between the reconstructed Cr residual 348 and the reconstructed Cr residual 448. Therefore, the preferred mode 488 determined by the mode decision module 400 would be the same as the preferred mode 388 determined by the mode decision module 300, as each of the JCCR-on distortion and the JCCR-off distortion remain substantially the same regardless of whether they are computed with the mode decision module 300 or the mode decision module 400.

Figure 5:
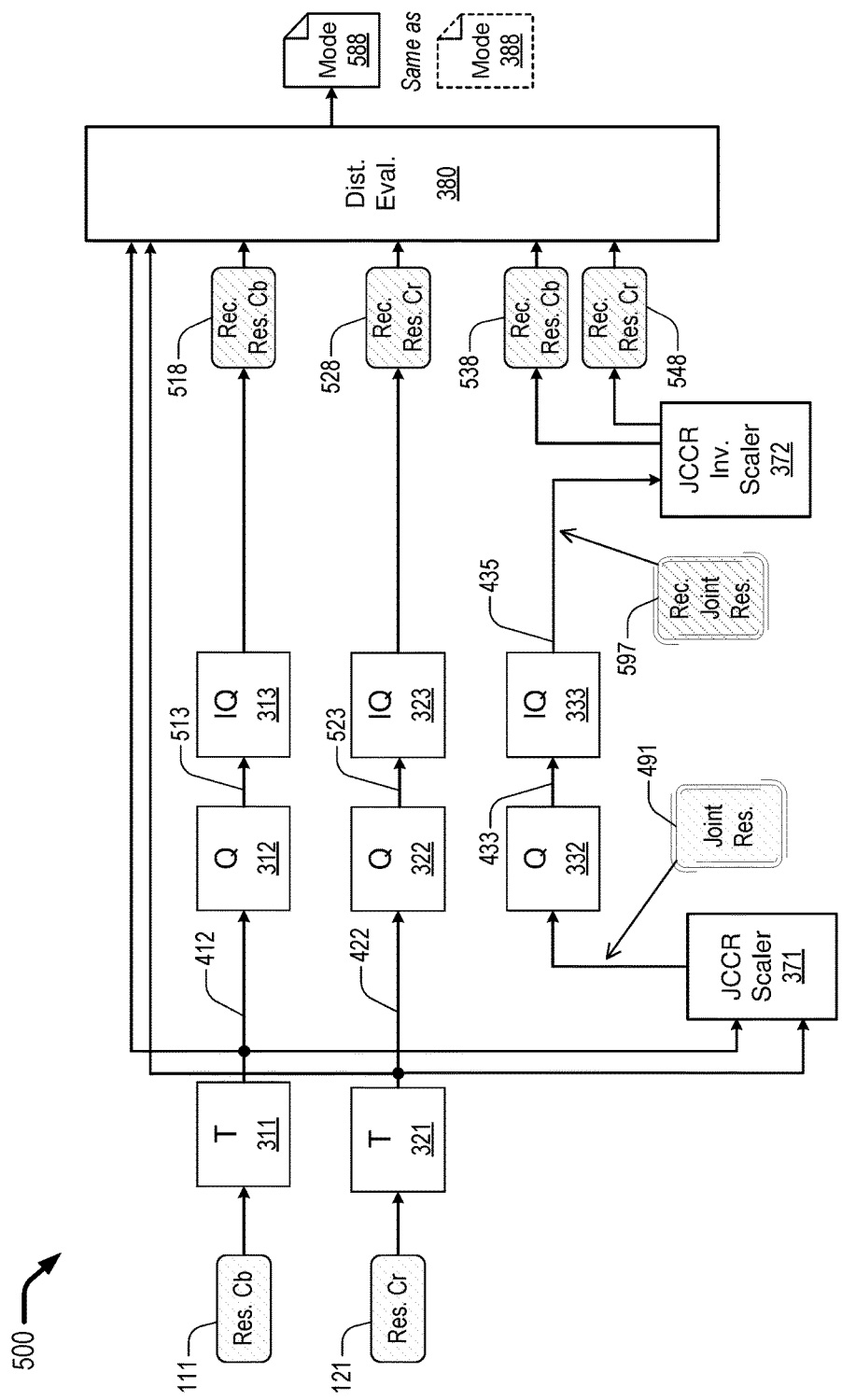
FIG. 5 is a diagram of an example design in accordance with an implementation of the present disclosure.

FIG. 5 is a diagram of an example design in accordance with an implementation of the present disclosure, wherein a JCCR mode decision module 500 is illustrated. The mode decision module 500 is aimed at achieving the same purpose as the mode decision modules 300 and 400, namely, deciding whether or not to use a JCCR mode for encoding a block of a picture. The mode decision module 500 simulates the "JCCR off" mode and the "JCCR on" mode in a slightly different way as compared to the mode decision module 400. Specifically, the mode decision module 500 has the same blocks or modules as those of the mode decision module 400 except for the inverse transform modules 314, 324 and 334. Also, the mode decision module 500 uses different inputs for the JCCR inverse scaler 372 as compared to the mode decision module 400. That is, in the mode decision module 500, the JCCR inverse scaler 372 receives a reconstructed joint residual 597, which is identical to the pixel data 435 in the mode decision module 400, as an input. Namely, the reconstructed joint residual 597 is essentially a frequency-domain version of the reconstructed joint residual 497 that is in the spatial domain, as the inverse transform module 334, which is excluded from the mode decision module 500, would have transformed the reconstructed joint residual 597, which is in the frequency domain, to the reconstructed joint residual 497, which is in the spatial domain.

In the mode decision module 500, the JCCR inverse scaler 372 subsequently derives, based on the reconstructed joint residual 597 and using scaling operation analogues to Equations (2) and (3), a reconstructed Cb residual 538 and a reconstructed Cr residual 548. Given that the reconstructed joint residual 597 is in the frequency domain, the reconstructed Cb residual 538 and the reconstructed Cr residual 548 are also in the frequency domain. The JCCR inverse scaler 372 of FIG. 5 is configured to generate the reconstructed Cb residual 538 and the reconstructed Cr residual 548 using Equations (12) and (13) below:

$$\text{Rec. Res. } Cb538 = wt\_i\_Cb \times (\text{Rec. Jt. Res.} 597) \quad (12)$$

and $$\text{Rec. Res. } Cr548 = wt\_i\_Cr \times (\text{Rec. Jt. Res.} 597) \quad (13)$$

wherein $wt\_i\_Cb$ is a real number representing a scaling factor that is multiplied with the reconstructed joint residual 597 to generate the reconstructed Cb residual 538, and $wt\_i\_Cr$ is a real number representing a scaling factor that is multiplied with the reconstructed joint residual 597 to generate the reconstructed Cr residual 548. In some embodiments, the values of the scaling factors $wt\_i\_Cb$ and $wt\_i\_Cr$ may be dependent on the values of $wt\_Cb$ and/or $wt\_Cr$ of Equation (9). Equations (12) and (13) are applied to each pixel of the reconstructed joint residual 597. Namely, in deriving the reconstructed Cb residual 538 and the reconstructed Cr residual 548, the JCCR inverse scaler 372 uses same values of the scaling factors $wt\_i\_Cb$ and $wt\_i\_Cr$ for each pixel of the current block.

The exclusion of the inverse transform module 334 and the change of the input to the JCCR inverse scaler 372 collectively result in the "JCCR on" mode being simulated differently in the mode decision module 500 as compared to the mode decision module 400. Moreover, the exclusion of the inverse transform module 314 and 324 also results in the "JCCR off" mode being simulated differently in the mode decision module 500 as compared to the mode decision module 400. Specifically, the quantization modules 312 and 322 quantize the transformed Cb residual 412 and the transformed Cr residual 422 into transformed-and-quantized Cb residual 513 and transformed-and-quantized Cr residual 523, respectively. Subsequently, the inverse quantization modules 313 and 323 de-quantize the transformed-and-quantized Cb residual 513 and the transformed-and-quantized Cr residual 523 into reconstructed Cb residual 518 and reconstructed Cr residual 528, respectively. Same as the reconstructed Cb residual 538 and the reconstructed Cr residual 548, the reconstructed Cb residual 518 and the reconstructed Cr residual 528 are also in the frequency domain.

As in the mode decision module 400, the distortion evaluation module 380 of the mode decision module 500 is also configured to calculate a JCCR-off distortion value and a JCCR-on distortion value based on Equations (7) and (8), respectively. Since the mode decision module 500 simulates the "JCCR off" mode and the "JCCR on" mode differently from the mode decision module 400, as described above, the computation of the JCCR-off distortion value and the JCCR-on distortion value is also different. Specifically, for the mode decision module 500, JCCR_off_Cb_dist in Equation (7) represents the distortion (i.e., the difference) between the transformed Cb residual 412 and the reconstructed Cb residual 518, whereas JCCR_off_Cr_dist represents the difference between the transformed Cr residual 422 and the reconstructed Cr residual 528. Also, JCCR_on_Cb_dist in Equation (8) represents the difference between the transformed Cb residual 412 and the reconstructed Cb residual 538, whereas JCCR_on_Cr_dist represents the difference between the transformed Cr residual 422 and the reconstructed Cr residual 548. Both the JCCR-off distortion value and the JCCR-on distortion value are computed in the frequency domain in the mode decision module 500. In some embodiments, the distortion evaluation module 380 further determines a preferred mode 588 based on the JCCR-off distortion value and the JCCR-on distortion value in a same way as the preferred mode 388 is determined.

Accordingly, an essential difference between the mode decision module 400 and the mode decision module 500 is that the distortion values (i.e., the JCCR-off distortion value and the JCCR-on distortion value) are computed in the spatial domain for the former but in the frequency domain for the latter. By computing the distortion values in the frequency domain, the mode decision module 500 saves many components (e.g., the inverse transform modules 314, 324 and 334) as compared to the mode decision module 400. Moreover, the preferred mode 588 determined using distortion values computed in the frequency domain is essentially the same as the preferred mode 488 or 388 determined using distortion values computed in the spatial domain. This is because in general the distortion values computed in the frequency domain and the distortion values computed in the spatial domain substantially differ by only a constant. That is, the JCCR-off distortion value computed by the mode decision module 500 is substantially the JCCR-off distortion value computed by the mode decision module 400 scaled by a constant factor (i.e., a real number), whereas the JCCR-on distortion value computed by the mode decision module 500 is substantially the JCCR-on distortion value computed by the mode decision module 400 scaled by the same constant factor. Therefore, the preferred mode 588 is the same as the preferred mode 488 as determined by the distortion evaluation module 380 in both the mode decision module 500 and the mode decision module 400.

As described elsewhere herein above, the JCCR mode may include several sub-modes, each of which corresponds to a respective set of scaling factors. For example, the JCCR mode may include the JCCR sub-mode 1, the JCCR sub-mode 2, and the JCCR sub-mode 3 that correspond to the scaling factors specified in Equations (4)-(6), respectively. The current block may be coded in one of the JCCR sub-modes, or in the "JCCR off" mode. In an event that more than one JCCR sub-mode is applicable to code the current block, a JCCR mode decision module may be required to evaluate or otherwise simulate each of the JCCR sub-modes, as well as the "JCCR off" mode, and determine one of the JCCR sub-modes or the "JCCR off" mode as the preferred mode to be used for coding the current block.

Figure 6:
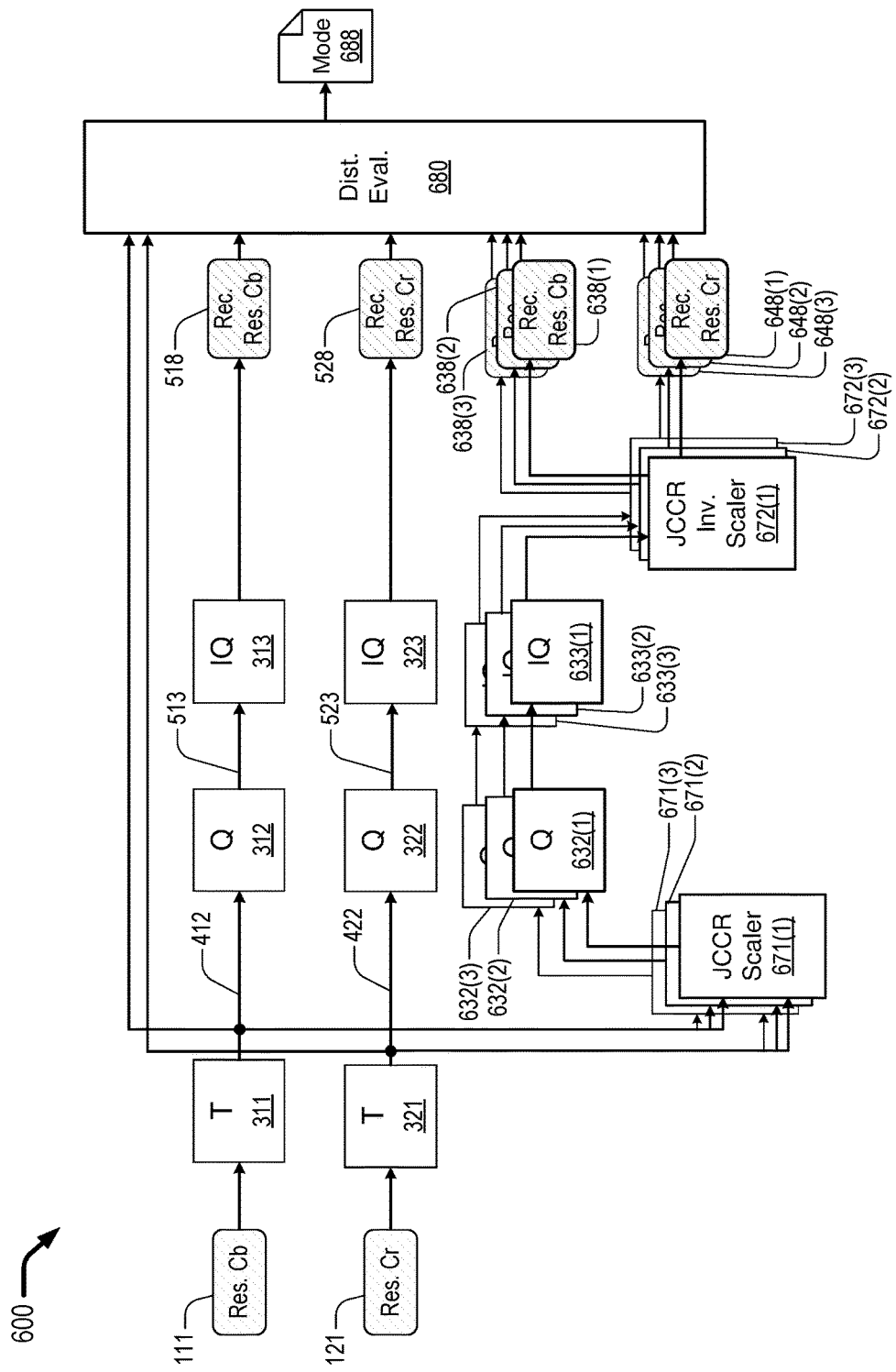
FIG. 6 is a diagram of an example design in accordance with an implementation of the present disclosure.

FIG. 6 is a diagram of an example design in accordance with an implementation of the present disclosure, wherein a JCCR mode decision module 600 is illustrated. The mode decision module 600 is aimed at deciding a preferred coding mode 688 for coding a current block, wherein the preferred coding mode 688 is selected from several predefined JCCR sub-modes (i.e., the JCCR sub-mode 1, the JCCR sub-mode 2, and the JCCR sub-mode 3 defined in Equations (4)-(6) and the "JCCR off" mode. The mode decision module 600 simulates the "JCCR off" mode using the same modules and the same method as the mode decision module 500. Moreover, the mode decision module 600 simulates each of the JCCR sub-mode 1, the JCCR sub-mode 2, and the JCCR sub-mode 3 using the same modules and the same method as the mode decision module 500, but with a respective set of scaling factors as defined in Equations (4), (5) and (6). That is, three sets of identical modules operate concurrently in parallel for simulating the JCCR sub-mode 1, the JCCR sub-mode 2, and the JCCR sub-mode 3, respectively.

As shown in FIG. 6, the first set of the modules, configured to simulate the JCCR sub-mode 1, includes a JCCR scaler 671(1), a quantization module 632(1), an inverse quantization module 633(1), and a JCCR inverse scaler 672(1). The second set of the modules, configured to simulate the JCCR sub-mode 2, includes a JCCR scaler 671(2), a quantization module 632(2), an inverse quantization module 633(2), and a JCCR inverse scaler 672(2). The third set of the modules, configured to simulate the JCCR sub-mode 3, includes a JCCR scaler 671(3), a quantization module 632(3), an inverse quantization module 633(3), and a JCCR inverse scaler 672(3). Each of the quantization modules 632(1)-(3) is identical to, and performs identical functions as, the quantization module 332 of the mode decision module 500. Each of the inverse quantization modules 633(1)-(3) is identical to, and performs identical functions as, the inverse quantization module 333 of the mode decision module 500. Each of the JCCR scalers 671(1)-(3) is identical to, and performs identical functions as, the JCCR scaler 371 of the mode decision module 500, except using a respective set of scaling factors defined in Equation (4), (5) or (6). Likewise, each of the JCCR inverse scalers 672(1)-(3) is identical to, and performs identical functions as, the JCCR inverse scaler 372 of the mode decision module 500, except using a respective set of scaling factors defined in Equation (4), (5) or (6).

The mode decision module 600 further includes a distortion evaluation module 680, which is configured to calculate a JCCR-off distortion value, as well as a respective JCCR-on distortion value for each of the JCCR sub-modes 1, 2 and 3. Based on the four distortion values as computed, the distortion evaluation module 680 may be further configured to determine a preferred mode 688 that is to be used for coding the current block. Specifically, the distortion evaluation module 680 is configured to calculate a JCCR-off distortion value based on Equation (7), with JCCR_off_Cb_dist in Equation (7) representing the distortion (i.e., the difference) between the transformed Cb residual 412 and the reconstructed Cb residual 518, and with JCCR_off_Cr_dist in Equation (7) representing the difference between the transformed Cr residual 422 and the reconstructed Cr residual 528. Additionally, the distortion evaluation module 680 is configured to calculate a JCCR-on distortion value for each of the JCCR sub-modes 1, 2 and 3 based on Equation (8). In calculating the JCCR-on distortion value for the JCCR sub-mode 1, JCCR_on_Cb_dist in Equation (8) represents the difference between the transformed Cb residual 412 and a reconstructed Cb residual 638(1), whereas JCCR_on_Cr_dist represents the difference between the transformed Cr residual 422 and a reconstructed Cr residual 648(1). In calculating the JCCR-on distortion value for the JCCR sub-mode 2, JCCR_on_Cb_dist in Equation (8) represents the difference between the transformed Cb residual 412 and a reconstructed Cb residual 638(2), whereas JCCR_on_Cr_dist represents the difference between the transformed Cr residual 422 and a reconstructed Cr residual 648(2). In calculating the JCCR-on distortion value for the JCCR sub-mode 3, JCCR_on_Cb_dist in Equation (8) represents the difference between the transformed Cb residual 412 and a reconstructed Cb residual 638(3), whereas JCCR_on_Cr_dist represents the difference between the transformed Cr residual 422 and a reconstructed Cr residual 648(3). The reconstructed Cb residual 638(1), the reconstructed Cb residual 638(2) and the reconstructed Cb residual 638(3) are reconstructed residuals for the Cb chroma component of the current block, which are generated by the JCCR inverse scalers 672(1), 672(2) and 672(3), respectively. The reconstructed Cr residual 648(1), the reconstructed Cr residual 648(2) and the reconstructed Cr residual 648(3) are reconstructed residuals for the Cr chroma component of the current block, which are generated by the JCCR inverse scalers 672(1), 672(2) and 672(3), respectively. As in the mode decision module 500, each of the JCCR-off distortion value and the three JCCR-on distortion values is computed in the frequency domain in the mode decision module 600.

In some embodiments, the distortion evaluation module 680 may further determine the preferred mode 688 based on the JCCR-off distortion value and the three JCCR-on distortion values, wherein the preferred mode 688 is one of the four candidate coding modes, i.e., the "JCCR off" mode, the JCCR sub-mode 1, the JCCR sub-mode 2, and the JCCR sub-mode 3. For example, the distortion evaluation module

680 may compare the JCCR-off distortion value, the JCCR sub-modes 1 distortion value, the JCCR sub-modes 2 distortion value and the JCCR sub-modes 3 distortion value as computed, and subsequently designate the mode having the lowest distortion value among the four candidate coding modes as the preferred mode 688.

Compared with the mode decision module 500, the mode decision module 600 is capable of evaluating two more candidate JCCR sub-modes. The cost of this expanded capability includes the hardware and/or software resources for realizing two additional JCCR scalers, two additional JCCR inverse scalers, two additional quantization modules, and two additional inverse quantization modules as compared to the mode decision module 500. The cost for realizing the JCCR scalers and JCCR inverse scalers are relatively low compared to the cost for realizing the quantization modules and the inverse quantization modules, since the operations involved in the JCCR scalers and JCCR inverse scalers are merely scaling (i.e., multiplication) and addition. In contrast, the operations involved in the quantization modules and the quantization modules are much more complicated, and the cost of which is much higher.

III. JCCR Mode Decision with Sub-Mode Preselection

Figure 7:
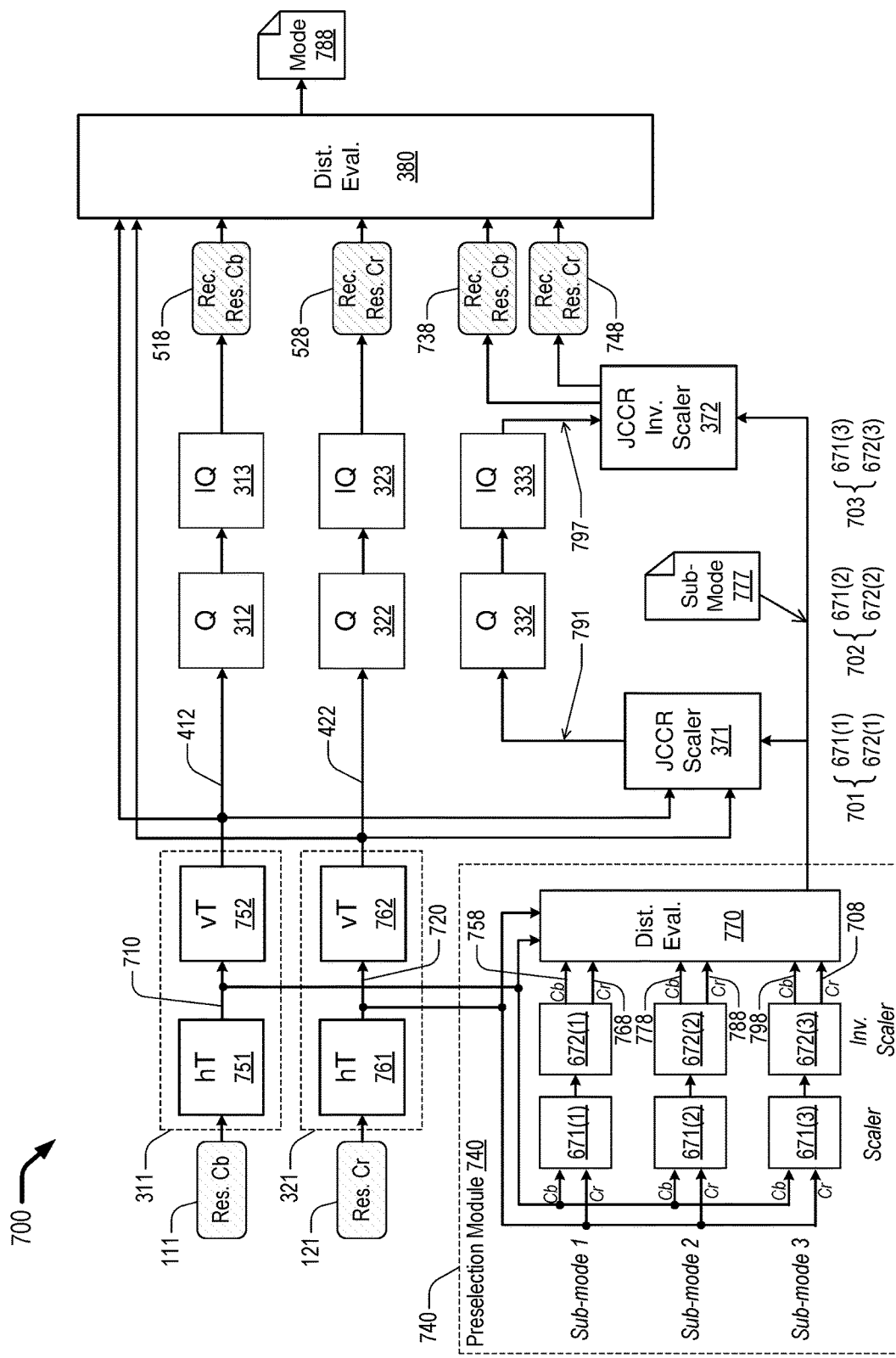
FIG. 7 is a diagram of an example design in accordance with an implementation of the present disclosure.

FIG. 7 is a diagram of an example design in accordance with an implementation of the present disclosure, wherein a JCCR mode decision module 700 is illustrated. The mode decision module 700 is aimed at achieving the same function as the mode decision module 600, i.e., deciding a preferred coding mode 788 for coding a current block, wherein the preferred coding mode 788 is selected from four candidate chroma coding modes, i.e., the JCCR sub-mode 1, the JCCR sub-mode 2, the JCCR sub-mode 3, and the "JCCR off" mode. The mode decision module 700 is able to achieve the same function by not including the two additional quantization modules and the two additional inverse quantization modules, i.e., the modules 632(2), 632(3), 633(2) and 633(3). In fact, the mode decision module 700 has a same number of quantization modules and inverse quantization modules as the mode decision module 500.

The difference between the mode decision modules 500 and 700 resides in a preselection module 740 of the latter. As shown in FIG. 7, the preselection module 740 includes the JCCR scalers 671(1)-(3) and the JCCR inverse scalers 672(1)-(3). The preselection module 740 also includes a distortion evaluation module 770, which performs a partial function of the distortion evaluation module 680. Basically, the preselection module 740 performs a quick screening or preselection operation for multiple candidate JCCR sub-modes (e.g., the JCCR sub-modes 1, 2 and 3 as described elsewhere herein above) and accordingly selects one of the candidate JCCR sub-modes as a preferred sub-mode 777. Accordingly, the distortion evaluation module 380 of the mode decision module 700 computes JCCR-on distortion value for the preferred sub-mode 777 only, without computing JCCR-on distortion values for the rest of the candidate JCCR sub-modes, i.e., the candidate JCCR sub-modes other than the preferred sub-mode 777. The operation of the preselection module 740 is detailed below.

The preselection module 740 may be viewed as three pipelines 701, 702 and 703 operating in parallel, with each of the three pipelines 701-703 configured to evaluate one of the three candidate JCCR sub-modes, i.e., the JCCR sub-modes 1, 2 and 3. The JCCR sub-modes 1, 2 and 3 are predefined JCCR sub-modes, each of which defining or specifying values of a respective set of scaling factors, i.e., the parameters wt_Cb, wt_Cr, wt_i_Cb and wt_i_Cr, as shown in Equation (4), (5) or (6). Specifically, the JCCR sub-mode 1 is evaluated by the pipeline 701 comprising the JCCR scaler 671(1) concatenated with the JCCR inverse scaler 672(1), whereas the scaling factors specified in Equation (4) are applied to the JCCR scaler 671(1) and the JCCR inverse scaler 672(1). The JCCR sub-mode 2 is evaluated by the pipeline 702 comprising the JCCR scaler 671(2) concatenated with the JCCR inverse scaler 672(2), whereas the scaling factors specified in Equation (5) are applied to the JCCR scaler 671(2) and the JCCR inverse scaler 672(2). The JCCR sub-mode 3 is evaluated by the pipeline 703 comprising the JCCR scaler 671(3) concatenated with the JCCR inverse scaler 672(3), whereas the scaling factors specified in Equation (6) are applied to the JCCR scaler 671(3) and the JCCR inverse scaler 672(3). The pipelines 701-703 are configured to map a pair of partially transformed residuals to a respective pair of mapped residuals using the set of scaling factors defined by the JCCR sub-modes 1, 2 and 3, respectively. As shown in FIG. 7, the pair of partially transformed residuals comprises a horizontally transformed Cb residual 710 and a horizontally transformed Cr residual 720, the generation of which is described elsewhere herein below. Specifically, the pipeline 701 is configured to map the horizontally transformed Cb and Cr residuals 710 and 720 to a mapped Cb residual 758 and a mapped Cr residual 768; the pipeline 702 is configured to map the horizontally transformed Cb and Cr residuals 710 and 720 to a mapped Cb residual 778 and a mapped Cr residual 788; the pipeline 703 is configured to map the horizontally transformed Cb and Cr residuals 710 and 720 to a mapped Cb residual 798 and a mapped Cr residual 708. Specifically, the mapped Cb and Cr residuals 758 and 768 are generated by the JCCR inverse scaler 672(1). Likewise, the mapped Cb and Cr residuals 778 and 788 are generated by the JCCR inverse scaler 672(2), whereas the mapped Cb and Cr residuals 798 and 708 are generated by the JCCR inverse scaler 672(3).

The distortion evaluation module 770 is configured to compute a respective distortion value for each of the JCCR sub-modes 1, 2 and 3 based on the inputs and the outputs of the pipelines 701-703. That is, the respective distortion value is computed based on the horizontally transformed Cb and Cr residuals 710 and 720, as well as the mapped Cb and Cr residuals generated by the corresponding pipeline (i.e., the pipeline 701, 702 or 703). Specifically, for evaluating the JCCR sub-mode 1, the distortion evaluation module 770 calculates a first distortion value representing the block-level difference between the horizontally transformed Cb and Cr residuals 710 and 720 and the mapped Cb and Cr residuals 758 and 768. Likewise, for evaluating the JCCR sub-mode 2, the distortion evaluation module 770 calculates a second distortion value representing the block-level difference between the horizontally transformed Cb and Cr residuals 710 and 720 and the mapped Cb and Cr residuals 778 and 788. Also, for evaluating the JCCR sub-mode 3, the distortion evaluation module 770 calculates a third distortion value representing the block-level difference between the horizontally transformed Cb and Cr residuals 710 and 720 and the mapped Cb and Cr residuals 798 and 708. Each of the first, second and third distortion values may be computed or calculated similar to how the JCCR-off distortion value and the JCCR-on distortion value are calculated according to Equations (7) and (8). The first, second and third distortion values may be computed using a SSD or a SAD that is calculated across every pixel of the current block. Based on the first, second and third distortion values, the distortion evaluation module 770 may designate one of the JCCR sub-modes 1, 2 and 3 as the preferred sub-mode 777. For example, in an event that the third distortion value is lower than the first and second distortion values, the distortion evaluation module 770 may designate the JCCR sub-mode 3 as the preferred sub-mode 777. Accordingly, the JCCR scaler 371 and the JCCR inverse scaler 372 of the mode decision module 700 may operate based on the parameter values specified in the Equation (6) rather than those in the Equation (4) or (5). Namely, by selecting the JCCR sub-mode 3 as the preferred sub-mode 777, the preselection module 740 thereby determines the values of the scaling factors wt_Cb, wt_Cr, wt_i_Cb and wt_i_Cr to be used with the JCCR scaler 371 and the JCCR inverse scaler 372 as those specified in the Equation (6).

The preferred sub-mode 777, and/or the scaling factors defined therein, may be sent to the JCCR scaler 371 and the JCCR inverse scaler 372. The JCCR scaler 371 and the JCCR inverse scaler 372 may accordingly perform scaling and inverse scaling operations using the scaling factors defined in the preferred sub-mode 777. Specifically, the JCCR scaler 371 of FIG. 7 is configured to generate joint residual 791 in the frequency domain according to Equation (14) below, with values of the scaling factors wt_Cb and wt_Cr defined in the preferred sub-mode 777:

$$(\text{Jt. Res.} 791) = wt\_Cb \times (\text{Trans. Res. } Cb412) + wt\_Cr \times (\text{Trans. Res. } Cr422) \quad (14).$$

The joint residual 791 is subsequently processed by the quantization module 332 and the inverse quantization module 333, resulting in reconstructed joint residual 797 in the frequency domain. The JCCR inverse scaler 372 of FIG. 7 is configured to generate the reconstructed Cb residual 738 and the reconstructed Cr residual 748 based on the reconstructed joint residual 797 using Equations (15) and (16) below:

$$\text{Rec. Res. } Cb738 = wt\_i\_Cb \times (\text{Rec. Jt. Res.} 797) \quad (15)$$

and $$\text{Rec. Res. } Cr748 = wt\_i\_Cr \times (\text{Rec. Jt. Res.} 797) \quad (16),$$

wherein values of the scaling factors wt_i_Cb and wt_i_Cr are defined in the preferred sub-mode 777.

As shown in FIG. 7, the transform module 311 may include a horizontal transform sub-module 751 and a vertical transform sub-module 752. The transform module 311 may transform the Cb residual 111 to the transformed Cb residual 412 in two steps, i.e., a first step followed by a second step. In the first step, the horizontal transform sub-module 751 may perform a horizontal transform on each row of the Cb residual 111 to generate horizontally transformed Cb residual 710. In the second step, the vertical transform sub-module 752 may perform a vertical transform on each column of the horizontally transformed Cb residual 710 to generate the transformed Cb residual 412, which is fully transformed.

Likewise, the transform module 321 may also include a horizontal transform sub-module 761 and a vertical transform sub-module 762. The horizontal transform sub-module 761 may be identical to the horizontal transform sub-module 751, whereas the vertical transform sub-module 762 may be identical to the vertical transform sub-module 752. The transform module 321 may transform the Cr residual 121 to the transformed Cr residual 422 in two steps, i.e., a first step followed by a second step. In the first step, the horizontal transform sub-module 761 may perform the horizontal transform on each row of the Cr residual 121 to generate horizontally transformed Cr residual 720. In the second step, the vertical transform sub-module 762 may perform the vertical transform on each column of the horizontally transformed Cr residual 720 to generate the transformed Cr residual 422, which is fully transformed. In some embodiments, a processing latency introduced by the preselection module 740 is substantially the same as, or smaller than, a processing latency introduced by each of the vertical transform sub-modules 752 and 762.

Although in FIG. 7 the horizontal transform sub-modules 751 and 761 precede the vertical transform sub-modules 752 and 762, respectively, the sequence may be swapped in some alternative embodiments. That is, in the alternative embodiments, the vertical transform sub-modules 752 and 762 may precede the horizontal transform sub-modules 751 and 761, respectively. Accordingly, the partially transformed Cb residual 710 and the partially transformed Cr residual 720 may comprise vertically transformed chroma residuals instead of horizontally transformed chroma residuals.

In some embodiments, the preselection module 740 may include only one pipeline (i.e., one of the pipelines 701-703) instead of three parallel pipelines (i.e., the pipelines 701-703), wherein the one pipeline may evaluate all three candidate JCCR sub-modes sequentially. For example, the preselection module 740 may include only the pipeline 701 but not the pipelines 702 and 703. The pipeline 701 may evaluate the JCCR sub-modes 1, 2 and 3 sequentially by generating the mapped Cb and Cr residuals 758 and 768 with the parameter values specified in Equation (4), followed by generating the mapped Cb and Cr residuals 778 and 788 with the parameter values specified in Equation (5), followed by generating the mapped Cb and Cr residuals 798 and 708 with the parameter values specified in Equation (6). It is worth noting that each of the pipelines 701-703 involves much less computation as compared to the vertical transform sub-modules 752 and 762. Therefore, even with only one of the pipelines 701-703 (e.g., the pipeline 701) employed to sequentially evaluate the JCCR sub-modes 1, 2 and 3, the processing latency introduced by the preselection module 740 is still substantially the same as, or smaller than, the processing latency introduced by each of the vertical transform sub-modules 752 and 762.

IV. Illustrative Implementations

Figure 8:
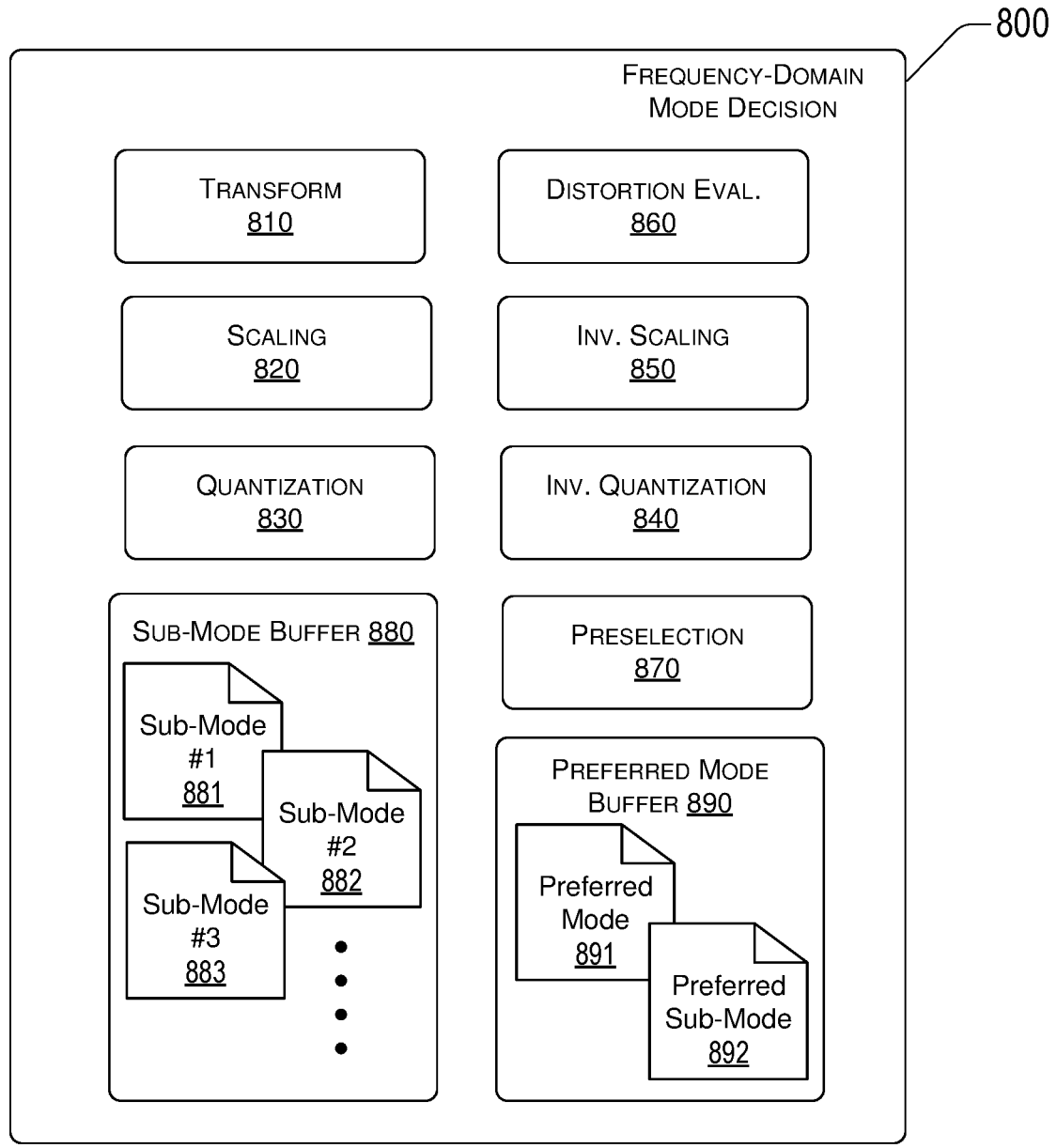
FIG. 8 is a diagram of an example mode decision apparatus in accordance with an implementation of the present disclosure.

FIG. 8 illustrates a frequency-domain mode decision apparatus 800 that may embody any of the JCCR mode decision modules 500, 600 and 700. The mode decision apparatus 800 may be part of a video encoder. The apparatus 800 may process pixel data of a coding block of a picture using a block-based pipeline process. The coding block may be referred to as a "current block". In some embodiments, the apparatus 800 may be configured to process the pixel data of the current block and accordingly determine a preferred coding mode for coding the current block. The apparatus 800 may simulate several candidate coding modes and calculate a distortion value for each of the candidate coding modes. The apparatus 800 may subsequently determine the preferred coding mode by comparing the distortion values. The apparatus 800 has several components or modules, including some components selected from a transform module 810, a scaling module 820, a quantization module 830, an inverse quantization module 840, an inverse scaling module 850, a distortion evaluation module 860, a preselection module 870, a sub-mode buffer 880, and a preferred mode buffer 890.

In some embodiments, the modules 810-890 as listed above are modules of software instructions being executed by one or more processing units (e.g., a processor) of a computing device or electronic apparatus. In some embodiments, the modules 810-890 are modules of hardware circuits implemented by one or more integrated circuits (ICs)

of an electronic apparatus. Though the modules 810-890 are illustrated as being separate modules, some of the modules can be combined into a single module.

The transform module 810 may be configured to process first pixel data of the current block and second pixel data of the current block. In some embodiments, the first pixel data may be residual data of a first chroma component (e.g., chroma component Cb) of the current block, whereas the second pixel data may be residual data of a second chroma component (e.g., chroma component Cr) of the current block. Namely, the first and second pixel data may respectively be the Cb residual 111 and the Cr residual 121 in FIG. 5-7. Specifically, the transform module 810 may transform the first pixel data in a spatial domain to first transformed data (e.g., the transformed Cb residual 412) in a frequency domain. The transform module 810 may further transform the second pixel data in the spatial domain to second transformed data (e.g., the transformed Cr residual 422) in the frequency domain. The transform module 810 may be embodied by the collection of the transform modules 311 and 321 of each of the mode decision modules 500, 600 or 700.

The scaling module 820 may be configured to generate joint pixel data based on the first and second transformed data produced by the transform module 810. For example, the scaling module 820 may be embodied by the JCCR scaler 371 of the mode decision module 500 or 700, or by any of the JCCR scalers 671(1)-(3) of the mode decision module 600. Given that the first transformed data and the second transformed data are both in the frequency domain, the joint pixel data also remains in the frequency domain. Moreover, the joint pixel data may comprise a pixelwise linear combination of the first and second transformed data. In some embodiments, the pixelwise linear combination of the first and second transformed data may comprise a sum of the first transformed data multiplied by a first scaling factor and the second transformed data multiplied by a second scaling factor. For example, the first and second transformed data may be the transformed Cr and Cr residuals 491 and 422, and the joint pixel data may be the joint residual 491 in FIG. 5. The joint residual 491 may be generated by the JCCR scaler 371 using Equation (9), and the first and second scaling factors may be the scaling factors wt_Cb and wt_Cr, respectively.

The quantization module 830 may be configured to quantize the joint pixel data generated by the scaling module 820 into quantized joint pixel data. For example, the quantization module 830 may be embodied by the quantization module 332 of the mode decision module 500 or 700, or by any of the quantization modules 632(1)-(3) of the mode decision module 600. The quantized joint pixel data may be the pixel data 433 in FIG. 5. Given that the joint pixel data is in the frequency domain, the quantized joint pixel data also remains in the frequency domain.

The inverse quantization module 840 may be configured to de-quantize the quantized joint pixel data generated by the quantization module 830 into reconstructed joint pixel data. For example, the inverse quantization module 840 may be embodied by the inverse quantization module 333 of the mode decision module 500 or 700, or by any of the inverse quantization modules 633(1)-(3) of the mode decision module 600. The reconstructed joint pixel data may be the reconstructed joint pixel data 597.

The inverse scaling module 850 may be configured to derive first reconstructed pixel data and second reconstructed pixel data based on the reconstructed joint pixel data generated by the inverse quantization module 840. For example, the inverse scaling module 850 may be embodied by the inverse scaling module 372 of the mode decision module 500 or 700, or by any of the inverse scaling modules 672(1)-(3) of the mode decision module 600. In an event that the inverse scaling module 850 is embodied by the inverse scaling module 372 of the mode decision module 500, the reconstructed joint pixel data may be the reconstructed joint pixel data 597, and the first reconstructed pixel data and second reconstructed pixel data may be the reconstructed Cb residual 538 and the reconstructed Cr residual 548, respectively. In an event that the inverse scaling module 850 is embodied by the inverse scaling module 372 of the mode decision module 700, the first reconstructed pixel data and second reconstructed pixel data may be reconstructed Cb residual 738 and reconstructed Cr residual 748 of FIG. 7, respectively. In an event that the inverse scaling module 850 is embodied by the inverse scaling modules 672(1), 672(2) or 672(3) of the mode decision module 600, the first reconstructed pixel data may be the reconstructed Cb residual 638(1), 638(2) or 638(3), whereas the second reconstructed pixel data may be the reconstructed Cr residual 648(1), 648(2) or 648(3). In some embodiments, the first reconstructed pixel data comprises the reconstructed joint pixel data multiplied by a third scaling factor, whereas the second reconstructed pixel data comprises the reconstructed joint pixel data multiplied by a fourth scaling factor. Specifically, in an event that the inverse scaling module 850 is embodied by the inverse scaling module 372 of the mode decision module 500, the first reconstructed pixel data (i.e., the reconstructed Cb residual 538) may be represented by Equation (12), whereas the second reconstructed pixel data (i.e., the reconstructed Cr residual 548) may be represented by Equation (13). That is, the third and fourth scaling factors may be wt_i_Cb of Equation (12) and wt_i_Cr of Equation (13), respectively.

The distortion evaluation module 860 may be configured to calculate a first distortion value based on the first transformed data and the first reconstructed pixel data and a second distortion value based on the second transformed data and the second reconstructed pixel data. For example, the distortion evaluation module 860 may be embodied by the distortion evaluation module 380 of the mode decision module 500 or 700, or by any of the distortion evaluation module 680 of the mode decision module 600. The first distortion value may be the JCCR_on_Cb_dist of Equation (8), whereas the second distortion value may be the JCCR_on_Cr_dist of Equation (8). In an event that the distortion evaluation module 860 is embodied by evaluation module 380 of the mode decision module 500, the distortion evaluation module 860 calculates JCCR_on_Cb_dist based on the transformed Cb residual 412 and the reconstructed Cb residual 538, and also JCCR_on_Cr_dist based on the transformed Cr residual 422 and the reconstructed Cr residual 548. In an event that the distortion evaluation module 860 is embodied by evaluation module 380 of the mode decision module 700, the distortion evaluation module 860 calculates JCCR_on_Cb_dist based on the transformed Cb residual 412 and the reconstructed Cb residual 738, and also JCCR_on_Cr_dist based on the transformed Cr residual 422 and the reconstructed Cr residual 748. It is worth noting that JCCR_on_Cb_dist and JCCR_on_Cr_dist are calculated by the distortion evaluation module 860 using data in the frequency domain.

In some embodiments, the quantization module 830 may be embodied by more than one quantization module in FIG. 5, 6 or 7. For example, the quantization module 830 may be embodied by a combination of the quantization modules 312, 322 and 332 of FIG. 5. Accordingly, the quantization module 830 may be further configured to quantize the first transformed pixel data into first transformed-and-quantized pixel data and the second transformed pixel data into second transformed-and-quantized pixel data. For example, the quantization module 830, embodied by the combination of the quantization modules 312, 322 and 332 of FIG. 5, may further quantize the transformed Cb residual 412 and the transformed Cr residual 422 into the transformed-and-quantized Cb residual 513 and the transformed-and-quantized Cr residual 523, respectively.

In some embodiments, the inverse quantization module 840 may be embodied by more than one inverse quantization module in FIG. 5, 6 or 7. For example, the inverse quantization module 840 may be embodied by a combination of the inverse quantization modules 313, 323 and 333 of FIG. 5. Accordingly, the inverse quantization module 840 may be further configured to de-quantize the first transformed-and-quantized pixel data into third reconstructed pixel data and the second transformed-and-quantized pixel data into fourth reconstructed pixel data. For example, the inverse quantization module 840, embodied by the combination of the inverse quantization modules 313, 323 and 333 of FIG. 5 or 7, may further de-quantize the transformed-and-quantized Cb residual 513 and the transformed-and-quantized Cr residual 523 into the reconstructed Cb residual 518 and the reconstructed Cr residual 528, respectively. The reconstructed Cb residual 518 and the reconstructed Cr residual 528 are also in the frequency domain.

In some embodiments, the distortion evaluation module 860 is further configured to calculate a third distortion value based on the first transformed data and the third reconstructed pixel data and a fourth distortion value based on the second transformed data and the fourth reconstructed pixel data. For example, the distortion evaluation module 860, embodied by the distortion evaluation module 380 of the mode decision module 500 or 700, or by the distortion evaluation module 680 of the mode decision module 600, may calculate JCCR_off_Cb_dist of Equation (7) based on the transformed Cb residual 412 and the reconstructed Cb residual 518, as well as JCCR_off_Cr_dist of Equation (7) based on the transformed Cr residual 422 and the reconstructed Cr residual 528.

In some embodiments, the distortion evaluation module 860 is further configured to determine a preferred coding mode 891 (e.g., the preferred mode 588, 688 or 788) based on the calculated first, second, third and fourth distortion values. The distortion evaluation module 860 may determine the preferred coding mode by comparing a sum of the first and second distortion values and a sum of the third and fourth distortion values. For example, the distortion evaluation module 860, embodied by the distortion evaluation module 380 of the mode decision module 500 or 700, may compare the JCCR-off distortion value of Equation (7) and the JCCR-on distortion value of Equation (8), thereby determining the preferred mode 588 or 788.

The preselection module 870 may be configured to determine values of the first, second, third and fourth scaling factors by selecting a preferred sub-mode 891 among a plurality of predefined sub-modes such as sub-modes 881, 882 and 883, wherein each of the plurality of predefined sub-modes may define a respective set of values of the first, second, third and fourth scaling factors. The preselection module 870 may be embodied by the preselection module 740, and the first, second, third and fourth scaling factors may be wt_Cb, wt_Cr, wt_i_Cb and wt_i_Cr of Equations (13)-(15) and defined in the preferred sub-mode 777, which is selected by the preselection module 740.

The sub-mode buffer 880 may be configured to store the plurality of predefined sub-modes, such as the sub-modes 881, 882 and 883. Each of the sub-modes 881, 882 and 883 may define a set of values of the first, second, third and fourth scaling factors.

The preferred mode buffer 890 may be configured to store the preferred mode 891 determined by the distortion evaluation module 860 and the preferred sub-mode 892 selected by the preselection module 870. The scaling module 820 and the inverse scaling module 850 may access the preferred mode buffer 890 to fetch parameter values of the first, second, third and fourth scaling factors of the preferred sub-mode 892. Other parts of the video encoder (e.g., the video decoder 900 described below) that incorporates the apparatus 800, as well as a corresponding video decoder (e.g., the video decoder 1000 described elsewhere herein below), may access the preferred mode buffer 890 to fetch information of the preferred mode 891.

In some embodiments, the apparatus 800 may further include an inverse transform module configured to transform the reconstructed joint pixel data (e.g., pixel data 435) to spatial-domain reconstructed joint pixel data (e.g., reconstructed joint residual 497). Also, the inverse scaling module 850 may be further configured to derive fifth reconstructed pixel data (e.g., the reconstructed Cb residual 438) and sixth reconstructed pixel data (e.g., the reconstructed Cr residual 448) based on the spatial-domain reconstructed joint pixel data. Moreover, the distortion evaluation module 860 may be further configured to calculate a fifth distortion value based on the first pixel data and the fifth reconstructed pixel data, as well as a sixth distortion value based on the second pixel data and the sixth reconstructed pixel data.

Figure 9:
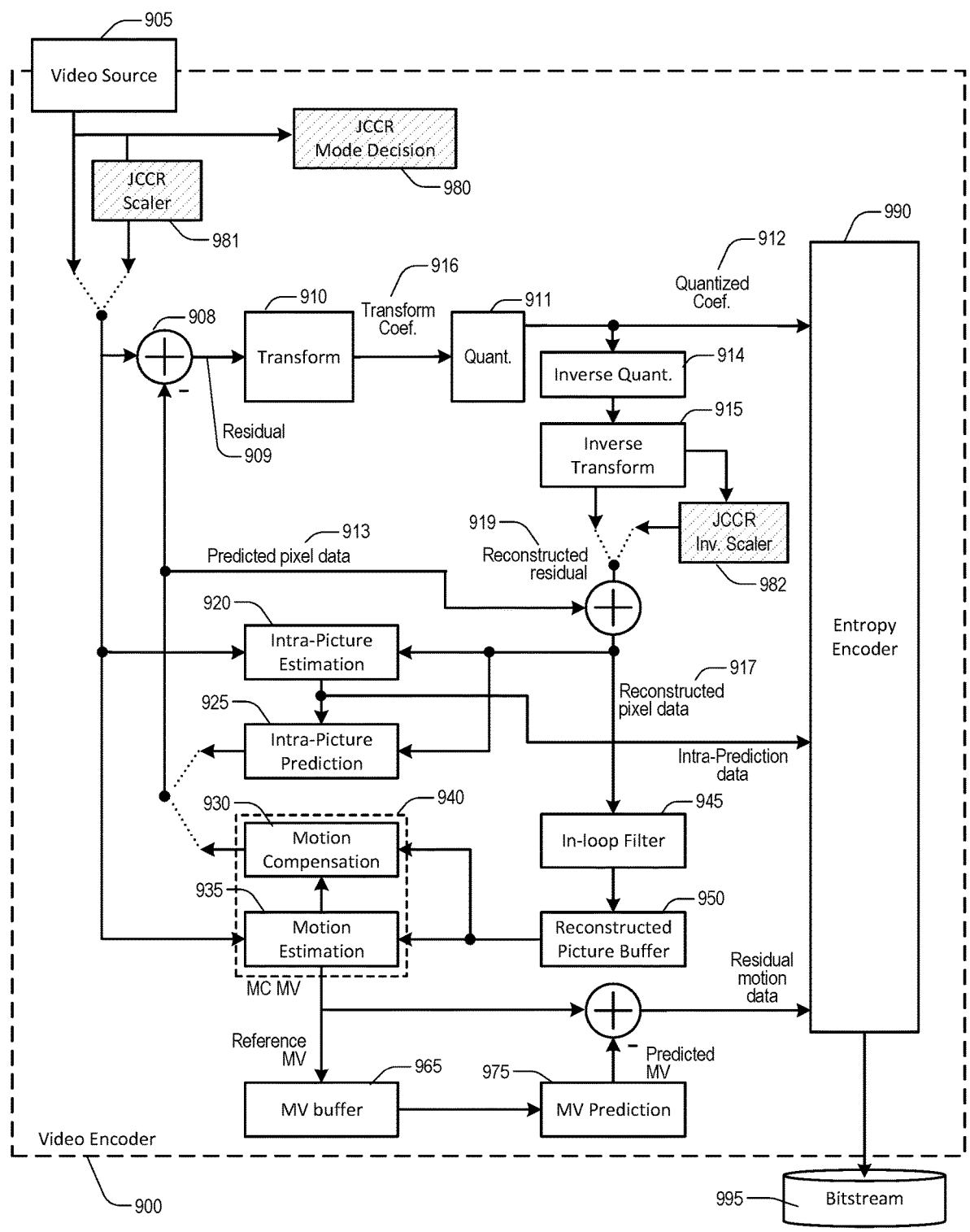
FIG. 9 is a diagram of an example video encoder in accordance with an implementation of the present disclosure.

FIG. 9 illustrates an example video encoder 900, wherein the various embodiments, filtering schemes and data schemes described elsewhere herein above may be adopted. As illustrated, the video encoder 900 receives input video signal from a video source 905 and encodes the signal into bitstream 995. The video encoder 900 has several components or modules for encoding the signal from the video source 905, at least including some components selected from a transform module 910, a quantization module 911, an inverse quantization module 914, an inverse transform module 915, an intra-picture estimation module 920, an intra-prediction module 925, a motion compensation module 930, a motion estimation module 935, an in-loop filter 945, a reconstructed picture buffer 950, a motion vector (MV) buffer 965, a MV prediction module 975, a JCCR mode decision module 980, a JCCR scaler 981, a JCCR inverse scaler 982, and an entropy encoder 990. The motion compensation module 930 and the motion estimation module 935 are part of an inter-prediction module 940. The inter-prediction module 940 may include an integer motion estimation (IME) kernel which is configured to perform integer pixel search, as well as a fractional motion estimation (FME) kernel which is configured to perform fractional pixel search. Both the integer pixel search and the fractional pixel search are essential functions for the motion compensation module 930 and the motion estimation module 935. In some embodiments, the JCCR scaler 981 and the JCCR inverse scaler 982 may be part of the JCCR mode decision module 980.

In some embodiments, the modules 910-990 as listed above are modules of software instructions being executed by one or more processing units (e.g., a processor) of a computing device or electronic apparatus. In some embodiments, the modules 910-990 are modules of hardware circuits implemented by one or more integrated circuits (ICs) of an electronic apparatus. Though the modules 910-990 are illustrated as being separate modules, some of the modules can be combined into a single module.

The video source 905 provides a raw video signal that presents pixel data of each picture of a video without compression. The encoder 900 may be receiving pixel data of a current block of a picture from the video source 905. In an event that the current block is intended to be coded without a JCCR mode, the pixel data is sent directly to a subtractor 908. In an event that the current block is intended to be coded with the JCCR mode, the pixel data is sent to the JCCR scaler 981 before being sent to the subtractor 908. The subtractor 908 computes the difference between the pixel data from the video source 905, either directly or passing through the JCCR scaler 981, and the predicted pixel data 913 from the motion compensation module 930 or intra-prediction module 925. The transform module 910 converts the difference (or the residual pixel data or residual signal) 909 into transform coefficients 916 (e.g., by performing Discrete Cosine Transform, or DCT). The quantization module 911 quantizes the transform coefficients 916 into quantized data (or quantized coefficients) 912, which is encoded into the bitstream 995 by the entropy encoder 990.

The inverse quantization module 914 de-quantizes the quantized data (or quantized coefficients) 912 to obtain transform coefficients. In an event that the current block from the video source 905 is intended to be coded without the JCCR mode, the inverse transform module 915 performs inverse transform on the transform coefficients to produce reconstructed residual 919. In an event that the current block is intended to be coded with the JCCR mode, the reconstructed residual 919 is produced by a sequential combination of the inverse transform module 915 and the JCCR inverse scaler 982 as shown in FIG. 9. The reconstructed residual 919 is added with the predicted pixel data 913 to produce reconstructed pixel data 917. In some embodiments, the reconstructed pixel data 917 is temporarily stored in a line buffer (not illustrated) for intra-picture prediction and spatial MV prediction. The reconstructed pixels are filtered by the in-loop filter 945 and stored in the reconstructed picture buffer 950. In some embodiments, the reconstructed picture buffer 950 is a storage external to the video encoder 900. In some embodiments, the reconstructed picture buffer 950 is a storage internal to the video encoder 900.

The intra-picture estimation module 920 performs intra-prediction based on the reconstructed pixel data 917 to produce intra prediction data. The intra-prediction data is provided to the entropy encoder 990 to be encoded into bitstream 995. The intra-prediction data is also used by the intra-prediction module 925 to produce the predicted pixel data 913.

The motion estimation module 935 performs inter-prediction by producing MVs to reference pixel data of previously decoded frames stored in the reconstructed picture buffer 950. These MVs are provided to the motion compensation module 930 to produce predicted pixel data.

Instead of encoding the complete actual MVs in the bitstream, the video encoder 900 uses MV prediction to generate predicted MVs, and the difference between the MVs used for motion compensation and the predicted MVs is encoded as residual motion data and stored in the bitstream 995.

The MV prediction module 975 generates the predicted MVs based on reference MVs that were generated for encoding previously video frames, i.e., the motion compensation MVs that were used to perform motion compensation. The MV prediction module 975 retrieves reference MVs from previous video frames from the MV buffer 965. The video encoder 900 stores the MVs generated for the current video frame in the MV buffer 965 as reference MVs for generating predicted MVs.

The MV prediction module 975 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 995 by the entropy encoder 990.

The JCCR mode decision module 980 is configured to determine whether the current block is intended to be coded with or without the JCCR mode. The JCCR mode decision module 980 may be embodied by the apparatus 800. In an event that the JCCR mode decision module 980 determines the current block is intended to be coded with the JCCR mode, both the JCCR scaler 981 and the JCCR inverse scaler 982 are enabled. That is, the pixel data from the video source 905 is routed to the JCCR scaler 981 before reaching the subtractor 908. Also, pixel data generated by the inverse transform module 915 is routed to the JCCR inverse scaler 982 for generating the reconstructed residual 919, which is then added with the predicted pixel data 913. In some embodiments, the JCCR scaler 981 and the JCCR inverse scaler 982 may be part of the JCCR mode decision module 980. For example, the JCCR mode decision module 980 may be embodied by the apparatus 800, wherein the JCCR scaler 981 may be embodied by the scaling module 820, and wherein the JCCR inverse scaler 982 may be embodied by the inverse scaling module 850.

The entropy encoder 990 encodes various parameters and data into the bitstream 995 by using entropy-coding techniques such as context-adaptive binary arithmetic coding (CABAC) or Huffman encoding. The entropy encoder 990 encodes various header elements, flags, along with the quantized transform coefficients 912, and the residual motion data as syntax elements into the bitstream 995. The bitstream 995 is in turn stored in a storage device or transmitted to a decoder over a communications medium such as a network.

The in-loop filter 945 performs filtering or smoothing operations on the reconstructed pixel data 917 to reduce the artifacts of coding, particularly at boundaries of pixel blocks. The in-loop filter 945 may include a deblocking filter, a sample adaptive offset (SAO) filter, and/or an adaptive loop filter (ALF).

Figure 10:
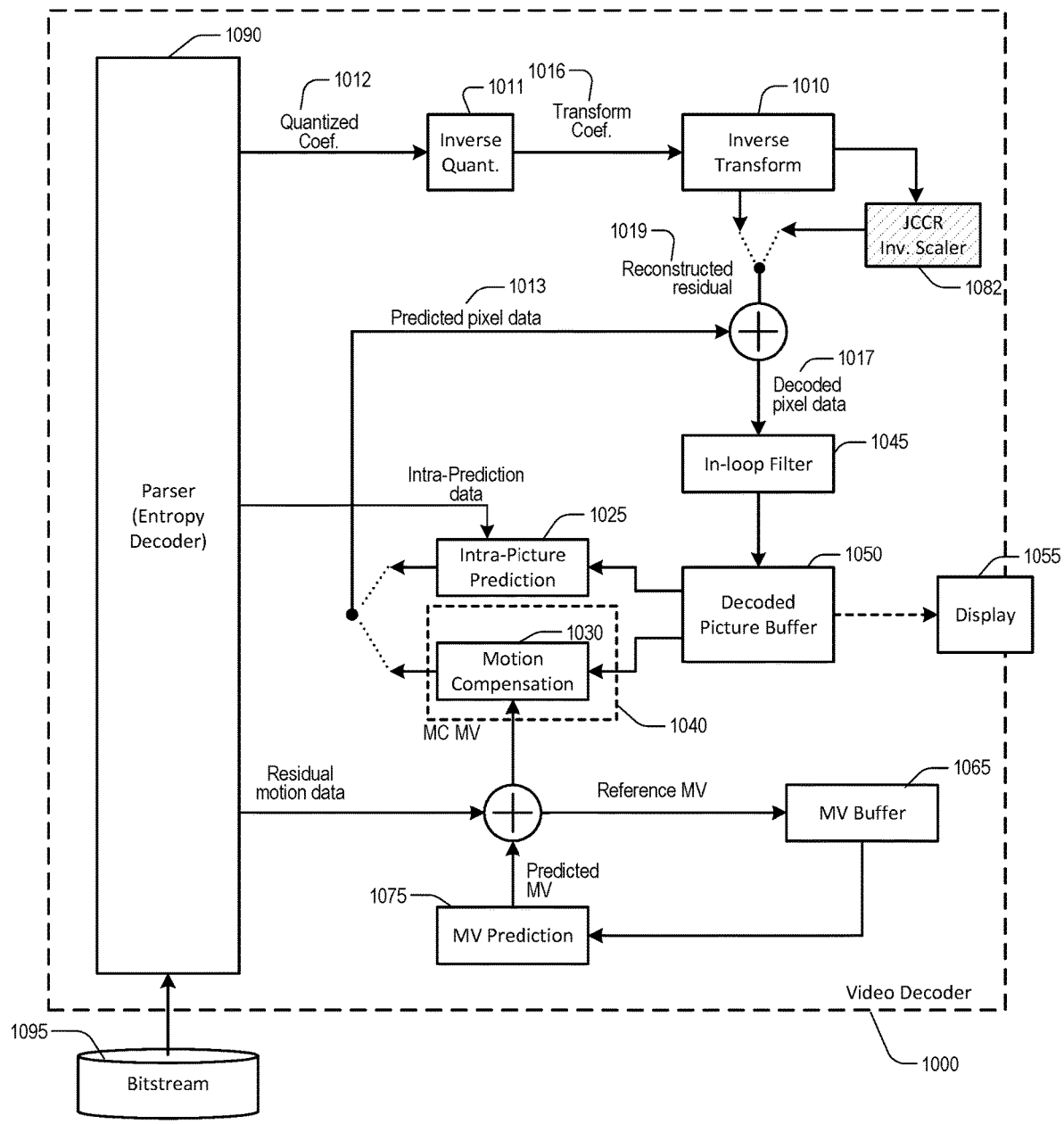
FIG. 10 is a diagram of an example video decoder in accordance with an implementation of the present disclosure.

FIG. 10 illustrates an example video decoder 1000. As illustrated, the video decoder 1000 is an image-decoding or video-decoding circuit that receives a bitstream 1095 and decodes the content of the bitstream 1095 into pixel data of video frames for display. The video decoder 1000 has several components or modules for decoding the bitstream 1095, including some components selected from an inverse quantization module 1011, an inverse transform module 1010, an intra-prediction module 1025, a motion compensation module 1030, an in-loop filter 1045, a decoded picture buffer 1050, a MV buffer 1065, a MV prediction module 1075, a JCCR inverse scaler 1082 and a parser 1090. The motion compensation module 1030 is part of an inter-prediction module 1040.

In some embodiments, the modules 1010-1090 are modules of software instructions being executed by one or more processing units (e.g., a processor) of a computing device. In some embodiments, the modules 1010-1090 are modules of hardware circuits implemented by one or more integrated circuits (ICs) of an electronic apparatus. Though the modules 1010-1090 are illustrated as being separate modules, some of the modules can be combined into a single module.

The parser (e.g., an entropy decoder) 1090 receives the bitstream 1095 and performs initial parsing according to the syntax defined by a video-coding or image-coding standard. The parsed syntax element includes various header elements, flags, as well as quantized data (or quantized coefficients) 1012. The parser 1090 parses out the various syntax elements by using entropy-coding techniques such as context-adaptive binary arithmetic coding (CABAC) or Huffman encoding.

The inverse quantization module 1011 de-quantizes the quantized data (or quantized coefficients) 1012 to obtain transform coefficients 1016. In an event that a current block being decoded has been encoded without a JCCR mode, the inverse transform module 1010 performs inverse transform on the transform coefficients 1016 to produce reconstructed residual signal 1019. In an event that the current block is has been encoded with the JCCR mode, the reconstructed residual signal 1019 is produced by a sequential combination of the inverse transform module 1010 and the JCCR inverse scaler 1082 as shown in FIG. 10. The reconstructed residual signal 1019 is added with predicted pixel data 1013 from the intra-prediction module 1025 or the motion compensation module 1030 to produce decoded pixel data 1017. The decoded pixels data 1017 are filtered by the in-loop filter 1045 and stored in the decoded picture buffer 1050. In some embodiments, the decoded picture buffer 1050 is a storage external to the video decoder 1000. In some embodiments, the decoded picture buffer 1050 is a storage internal to the video decoder 1000.

The intra-prediction module 1025 receives intra-prediction data from bitstream 1095 and according to which, produces the predicted pixel data 1013 from the decoded pixel data 1017 stored in the decoded picture buffer 1050. In some embodiments, the decoded pixel data 1017 is also stored in a line buffer (not illustrated) for intra-picture prediction and spatial MV prediction.

In some embodiments, the content of the decoded picture buffer 1050 is used for display. A display device 1055 either retrieves the content of the decoded picture buffer 1050 for display directly or retrieves the content of the decoded picture buffer to a display buffer. In some embodiments, the display device receives pixel values from the decoded picture buffer 1050 through a pixel transport.

The motion compensation module 1030 produces predicted pixel data 1013 from the decoded pixel data 1017 stored in the decoded picture buffer 1050 according to motion compensation MVs (MC MVs). These motion compensation MVs are decoded by adding the residual motion data received from the bitstream 1095 with predicted MVs received from the MV prediction module 1075.

The MV prediction module 1075 generates the predicted MVs based on reference MVs that were generated for decoding previous video frames, e.g., the motion compensation MVs that were used to perform motion compensation. The MV prediction module 1075 retrieves the reference MVs of previous video frames from the MV buffer 1065. The video decoder 1000 stores the motion compensation MVs generated for decoding the current video frame in the MV buffer 1065 as reference MVs for producing predicted MVs.

The in-loop filter 1045 performs filtering or smoothing operations on the decoded pixel data 1017 to reduce the artifacts of coding, particularly at boundaries of pixel blocks. In some embodiments, the filtering operation performed includes sample adaptive offset (SAO). In some embodiment, the filtering operations include adaptive loop filtering (ALF).

V. Illustrative Processes

Figure 11:
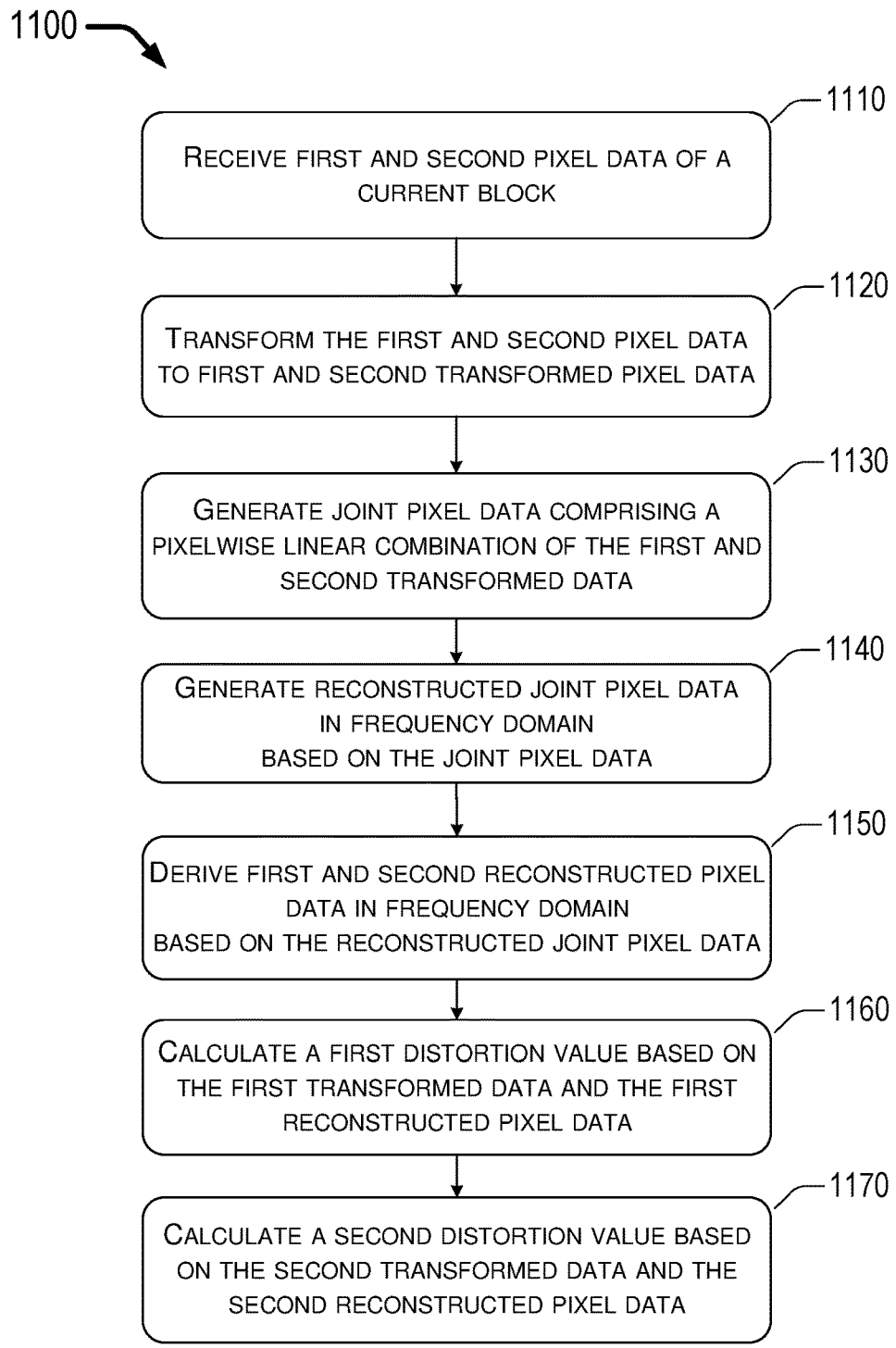
FIG. 11 is a flowchart of an example process in accordance with an implementation of the present disclosure.

FIG. 11 illustrates an example process 1100 in accordance with an implementation of the present disclosure. Process 1100 may represent an aspect of implementing various proposed designs, concepts, schemes, systems and methods described above. More specifically, process 1100 may represent an aspect of the proposed concepts and schemes pertaining to realizing a JCCR mode decision process in accordance with the present disclosure. Process 1100 may include one or more operations, actions, or functions as illustrated by one or more of blocks 1110, 1120, 1130, 1140, 1150, 1160 and 1170. Although illustrated as discrete blocks, various blocks of process 1100 may be divided into additional blocks, combined into fewer blocks, or eliminated, depending on the desired implementation. Moreover, the blocks/sub-blocks of process 1100 may be executed in the order shown in FIG. 11 or, alternatively in a different order. Furthermore, one or more of the blocks/sub-blocks of process 1100 may be executed repeatedly or iteratively. Process 1100 may be implemented by or in the apparatus 800 as well as any variations thereof. Solely for illustrative purposes and without limiting the scope, process 1100 are described below in the context of the apparatus 800. Process 1100 may begin at block 1110.

At 1110, process 1100 may involve the apparatus 800 receiving first pixel data and second pixel data of a current block. Each of the first pixel data and second pixel data comprises data of the current block in a spatial domain. For example, the apparatus 800 may receive the Cb residual 111 and the Cr residual 121 of the current block from the video source 905. The Cb residual 111 comprises the residual of the coding block in a Cb frame, whereas the Cr residual 121 comprises the residual of the coding block in a Cr frame. Namely, both the Cb residual 111 and the Cr residual 121 comprise data in the spatial domain. Process 1100 may proceed from 1110 to 1120.

At 1120, process 1100 may involve the transform module 810 transforming the first pixel data to first transformed data, and the second pixel data to second transformed data, wherein each of the first and second transformed data comprises data in a frequency domain. For example, the transform module 810 embodied by the transform module 311 of FIG. 4 or 5 may transform the Cb residual 111, which is in the spatial domain, to the transformed Cb residual 412, which is in the frequency domain, using DCT-2 transform. Likewise, the transform module 810 embodied by the transform module 321 of FIG. 4 or 5 may transform the Cr residual 121, which is in the spatial domain, to the transformed Cr residual 422, which is in the frequency domain, also using DCT-2 transform. Process 1100 may proceed from 1120 to 1130.

At 1130, process 1100 may involve the scaling module 820 generating joint pixel data based on the first and second transformed data, wherein the joint pixel data comprises a pixelwise linear combination of the first and second transformed data. For example, the scaling module 820 embodied by the scaling module 371 of FIG. 4 or 5 may generate the joint residual 491 based on the transformed Cb residual 412 and the transformed Cr residual 422 using Equation (9). In some embodiments, the pixelwise linear combination of the first and second transformed data comprises a sum of the first transformed data multiplied by a first scaling factor (e.g., wt_Cb of Equation (9)) and the second transformed data multiplied by a second scaling factor (e.g., wt_Cr of Equation (9)). Process 1100 may proceed from 1130 to 1140.

At 1140, process 1100 may involve a combination of the quantization module 830 and the inverse quantization module 840 generating reconstructed joint pixel data in the frequency domain based on the joint pixel data. In particular, the reconstructed joint pixel data may be generated by a quantization operation performed by the quantization module 830 followed by an inverse quantization operation performed by the inverse quantization module 840. For example, the quantization module 830 embodied by the quantization module 332 of FIG. 4 or 5 may quantize the joint residual 491 into the pixel data 433. Moreover, the inverse quantization module 840 embodied by the inverse quantization module 333 of FIG. 4 or 5 may de-quantize the pixel data 433 into the reconstructed joint residual 597. Process 1100 may proceed from 1140 to 1150.

At 1150, process 1100 may involve the inverse scaling module 850 deriving first reconstructed pixel data and second reconstructed pixel data based on the reconstructed joint pixel data, wherein each of the first and second reconstructed pixel data comprises data in the frequency domain. For example, the inverse scaling module 850 embodied by the JCCR inverse scaler 372 of FIG. 5 may derive the reconstructed Cb residual 538 and the reconstructed Cr residual 548 based on the reconstructed joint residual 597 using Equations (12) and (13). Both the reconstructed Cb residual 538 and the reconstructed Cr residual 548 are in the frequency domain. In some embodiments, the inverse scaling module 850 may designate the reconstructed joint pixel data multiplied by a third scaling factor (e.g., wt_i_Cb of Equation (12)) as the first reconstructed pixel data. Also, the inverse scaling module 850 may designate the reconstructed joint pixel data multiplied by a fourth scaling factor (e.g., wt_i_Cr of Equation (13)) as the second reconstructed pixel data. Process 1100 may proceed from 1150 to 1160.

At 1160, process 1100 may involve distortion evaluation module 860 calculating a first distortion value based on the first transformed data and the first reconstructed pixel data. For example, the distortion evaluation module 860 embodied by the distortion evaluation module 380 of FIG. 5 may calculate the JCCR_on_Cb_dist of Equation (8) by computing a SSD or a SAD between the transformed Cb residual 412 and the reconstructed Cb residual 538. Given that both the transformed Cb residual 412 and the reconstructed Cb residual 538 are in the frequency domain, the JCCR_on_Cb_dist as calculated indicates distortion in the frequency domain. Process 1100 may proceed from 1160 to 1170.

At 1170, process 1100 may involve the distortion evaluation module 860 calculating a second distortion value based on the second transformed data and the second reconstructed pixel data. For example, the distortion evaluation module 860 embodied by the distortion evaluation module 380 of FIG. 5 may calculate the JCCR_on_Cr_dist of Equation (8) by computing an SSD or an SAD between the transformed Cr residual 422 and the reconstructed Cr residual 548. Given that both the transformed Cr residual 422 and the reconstructed Cr residual 548 are in the frequency domain, the JCCR_on_Cr_dist as calculated indicates distortion in the frequency domain.

In some embodiments, process 1100 may further involve generating third reconstructed pixel data (e.g., the reconstructed Cb residual 518) based on the first transformed data by the quantization operation (e.g., performed by the quantization module 830 further embodied by the quantization module 312 of FIG. 5) followed by the inverse quantization operation (e.g., performed by the inverse quantization module 840 further embodied by the inverse quantization module 313 of FIG. 5). Process 1100 may further involve generating fourth reconstructed pixel data (e.g., the reconstructed Cr residual 528) based on the second transformed data by the quantization operation (e.g., performed by the quantization module 830 further embodied by the quantization module 322 of FIG. 5) followed by the inverse quantization operation (e.g., performed by the inverse quantization module 840 further embodied by the inverse quantization module 323 of FIG. 5). Process 1100 may further involve the distortion evaluation module 860 calculating a third distortion value based on the first transformed data and the third reconstructed pixel data, as well as calculating a fourth distortion value based on the second transformed data and the fourth reconstructed pixel data. In some embodiments, process 1100 may further involve the distortion evaluation module 860 determining a preferred coding mode (e.g., the preferred mode 891) by comparing a sum of the first and second distortion values and a sum of the third and fourth distortion values. In some embodiments, process 1100 may further involve the video encoder 900 coding the current block using the preferred coding mode.

In some embodiments, process 1100 may further involve the preselection module 870 determining values of the first, second, third and fourth scaling factors by selecting a preferred sub-mode (e.g., the preferred sub-mode 892) among a plurality of predefined sub-modes (e.g., the sub-modes 881, 882 and 883). Each of the plurality of predefined sub-modes is configured to define a respective set of values of the first, second, third and fourth scaling factors.

Figure 12:
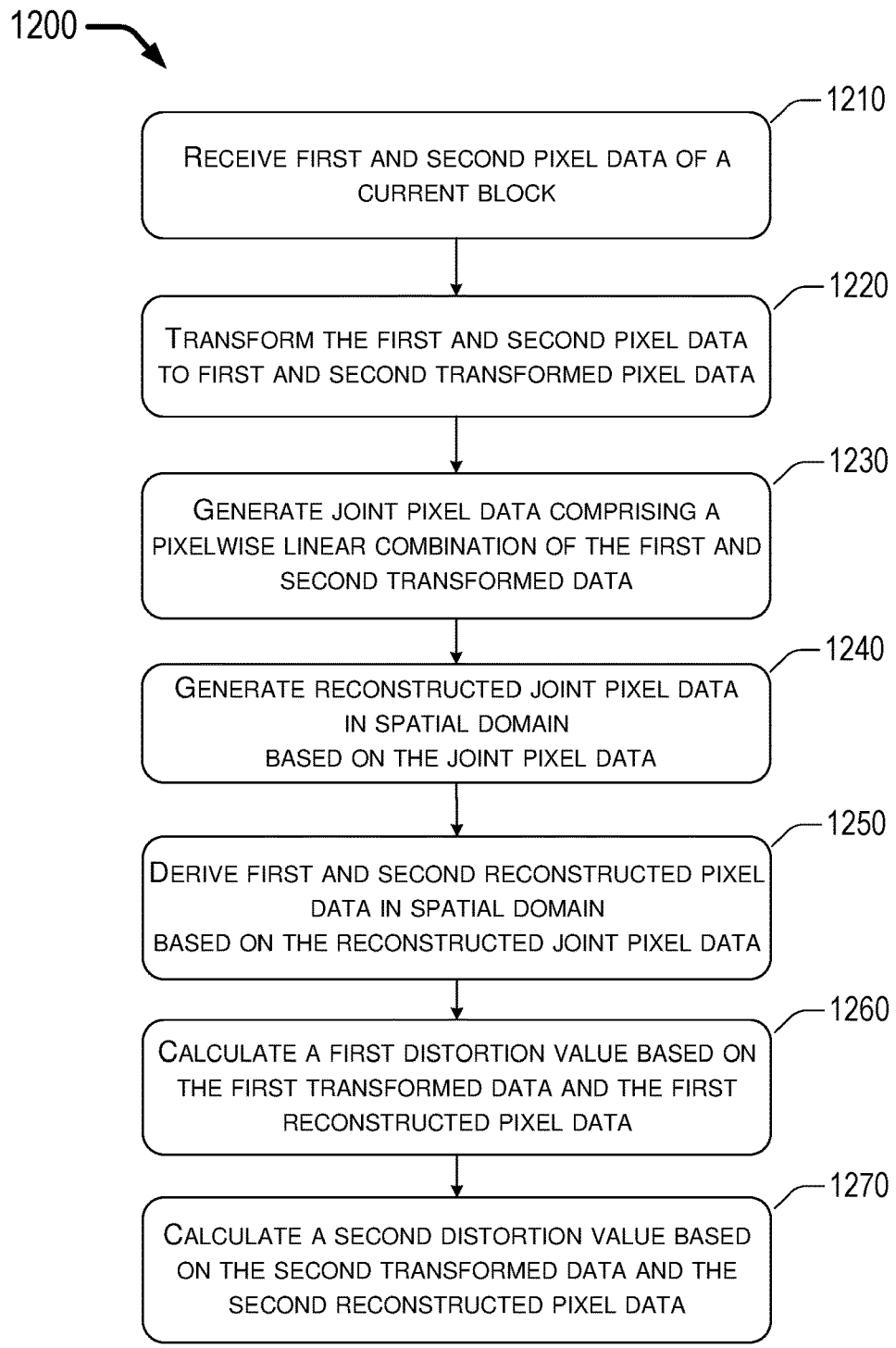
FIG. 12 is a flowchart of an example process in accordance with an implementation of the present disclosure.

FIG. 12 illustrates an example process 1200 in accordance with an implementation of the present disclosure. Process 1200 may represent an aspect of implementing various proposed designs, concepts, schemes, systems and methods described above. More specifically, process 1200 may represent an aspect of the proposed concepts and schemes pertaining to realizing a JCCR mode decision process in accordance with the present disclosure. Process 1200 may include one or more operations, actions, or functions as illustrated by one or more of blocks 1210, 1220, 1230, 1240, 1250, 1260 and 1270. Although illustrated as discrete blocks, various blocks of process 1200 may be divided into additional blocks, combined into fewer blocks, or eliminated, depending on the desired implementation. Moreover, the blocks/sub-blocks of process 1200 may be executed in the order shown in FIG. 12 or, alternatively in a different order. Furthermore, one or more of the blocks/sub-blocks of process 1200 may be executed repeatedly or iteratively. Process 1200 may be implemented by or in the apparatus 400 as well as any variations thereof. Solely for illustrative purposes and without limiting the scope, process 1200 are described below in the context of a specific embodiment of the apparatus 400, whereas the apparatus 400 is specifically embodied by a combination of the apparatus 800 and the inverse transform modules 314, 324 and 334 of FIG. 4. Process 1200 may begin at block 1210.

The block 1210 may be identical to the block 1110. Process 1200 may proceed from 1210 to 1220.

The block 1220 may be identical to the block 1120. Process 1200 may proceed from 1220 to 1230.

The block 1230 may be identical to the block 1130. Process 1200 may proceed from 1230 to 1240.

At 1240, process 1100 may involve generating reconstructed joint pixel data in the spatial domain based on the joint pixel data. This step may be performed by a combination of the quantization module 830, the inverse quantization module 840, and the inverse transform module 334 of FIG. 4. In particular, the reconstructed joint pixel data may be generated by a quantization operation performed by the quantization module 830 followed by an inverse quantization operation performed by the inverse quantization module 840 followed by an inverse transform operation performed by the inverse transform module 334. For example, the quantization module 830 embodied by the quantization module 332 of FIG. 4 may quantize the joint residual 491 into the pixel data 433. Moreover, the inverse quantization module 840 embodied by the inverse quantization module 333 of FIG. 4 may de-quantize the pixel data 433 into the pixel data 435. Furthermore, the inverse transform module 334 of FIG. 4 may transform the pixel data 435 to the reconstructed joint residual 497. Process 1100 may proceed from 1240 to 1250.

At 1250, process 1200 may involve the inverse scaling module 850 deriving first reconstructed pixel data and second reconstructed pixel data based on the reconstructed joint pixel data, wherein each of the first and second reconstructed pixel data comprises data in the spatial domain. For example, the inverse scaling module 850 embodied by the JCCR inverse scaler 372 of FIG. 4 may derive the reconstructed Cb residual 438 and the reconstructed Cr residual 448 based on the reconstructed joint residual 497 using Equations (10) and (11). Both the reconstructed Cb residual 438 and the reconstructed Cr residual 448 are in the spatial domain. Process 1200 may proceed from 1250 to 1260.

At 1260, process 1200 may involve distortion evaluation module 860 calculating a first distortion value based on the first pixel data and the first reconstructed pixel data. For example, the distortion evaluation module 860 embodied by the distortion evaluation module 380 of FIG. 4 may calculate the JCCR_on_Cb_dist of Equation (8) by computing a SSD or a SAD between the Cb residual 111 and the reconstructed Cb residual 438. Given that both the Cb residual 111 and the reconstructed Cb residual 438 are in the spatial domain, the JCCR_on_Cb_dist as calculated indicates distortion in the spatial domain. Process 1200 may proceed from 1260 to 1270.

At 1270, process 1200 may involve distortion evaluation module 860 calculating a second distortion value based on the second pixel data and the first reconstructed pixel data. For example, the distortion evaluation module 860 embodied by the distortion evaluation module 380 of FIG. 4 may calculate the JCCR_on_Cr_dist of Equation (8) by computing an SSD or an SAD between the Cr residual 121 and the reconstructed Cr residual 439. Given that both the Cr residual 121 and the reconstructed Cr residual 439 are in the spatial domain, the JCCR_on_Cr_dist as calculated indicates distortion in the spatial domain.

VI. Illustrative Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 13:
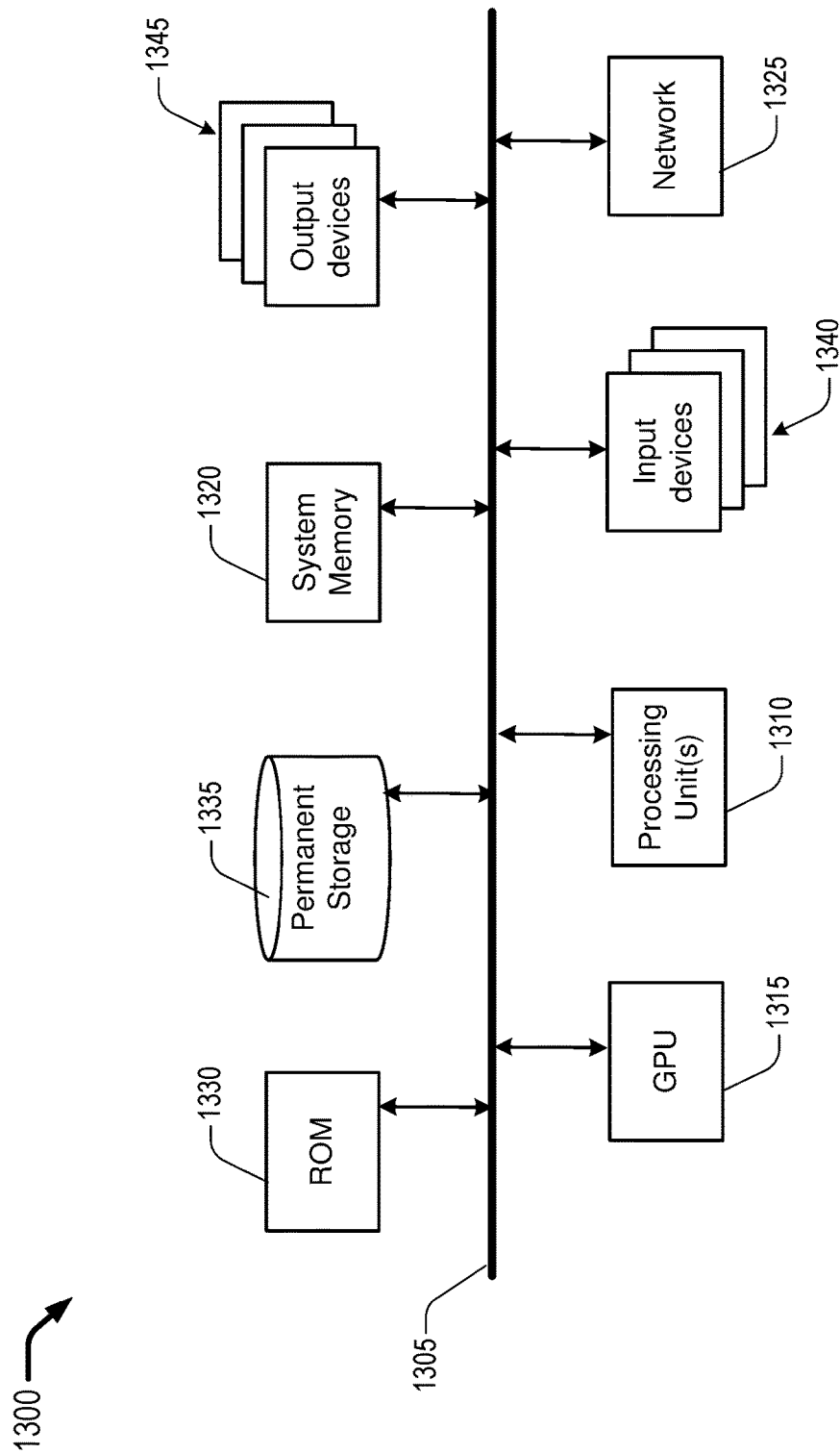
FIG. 13 is a diagram of an example electronic system in accordance with an implementation of the present disclosure.

FIG. 13 conceptually illustrates an electronic system 1300 with which some embodiments of the present disclosure are implemented. The electronic system 1300 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1300 includes a bus 1305, processing unit(s) 1310, a graphics-processing unit (GPU) 1315, a system memory 1320, a network 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the GPU 1315, the read-only memory 1330, the system memory 1320, and the permanent storage device 1335.

From these various memory units, the processing unit(s) 1310 retrieves instructions to execute and data to process in order to execute the processes of the present disclosure. The processing unit(s) may be a single processor or a multi-core processor in different embodiments. Some instructions are passed to and executed by the GPU 1315. The GPU 1315 can offload various computations or complement the image processing provided by the processing unit(s) 1310.

The read-only-memory (ROM) 1330 stores static data and instructions that are used by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the present disclosure use a mass-storage device (such as a magnetic or optical disk and its corresponding disk drive) as the permanent storage device 1335.

Other embodiments use a removable storage device (such as a floppy disk, flash memory device, etc., and its corresponding disk drive) as the permanent storage device. Like the permanent storage device 1335, the system memory 1320 is a read-and-write memory device. However, unlike storage device 1335, the system memory 1320 is a volatile read-and-write memory, such a random access memory. The system memory 1320 stores some of the instructions and data that the processor uses at runtime. In some embodiments, processes in accordance with the present disclosure are stored in the system memory 1320, the permanent storage device 1335, and/or the read-only memory 1330. For example, the various memory units include instructions for processing multimedia clips in accordance with some embodiments. From these various memory units, the processing unit(s) 1310 retrieves instructions to execute and data to process in order to execute the processes of some embodiments.

The bus 1305 also connects to the input and output devices 1340 and 1345. The input devices 1340 enable the user to communicate information and select commands to the electronic system. The input devices 1340 include alphanumeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1325 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray@ discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals. While the present disclosure has been described with reference to numerous specific details, one of ordinary skill in the art will recognize that the present disclosure can be embodied in other specific forms without departing from the spirit of the present disclosure.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method of processing a current block of a picture of a video, comprising:
    receiving first pixel data and second pixel data, each of the first and second pixel data comprising data of the current block in a spatial domain;
    transforming the first pixel data to first transformed data and the second pixel data to second transformed data, each of the first and second transformed data comprising data in a frequency domain;
    generating joint pixel data comprising a pixelwise linear combination of the first and second transformed data;
    generating reconstructed joint pixel data in the frequency domain based on the joint pixel data by a quantization operation followed by an inverse quantization operation;
    deriving first reconstructed pixel data and second reconstructed pixel data based on the reconstructed joint pixel data, each of the first and second reconstructed pixel data comprising data in the frequency domain;
    calculating a first distortion value based on the first transformed data and the first reconstructed pixel data; and
    calculating a second distortion value based on the second transformed data and the second reconstructed pixel data.

2. The method of claim 1, wherein:
    the first pixel data comprises residual data of a first chroma component of the current block, and
    the second pixel data comprises residual data of a second chroma component of the current block.

3. The method of claim 1, further comprising:
    generating third reconstructed pixel data based on the first transformed data by the quantization operation followed by the inverse quantization operation;
    generating fourth reconstructed pixel data based on the second transformed data by the quantization operation followed by the inverse quantization operation;
    calculating a third distortion value based on the first transformed data and the third reconstructed pixel data; and
    calculating a fourth distortion value based on the second transformed data and the fourth reconstructed pixel data.

4. The method of claim 3, further comprising:
    determining a preferred coding mode by comparing a sum of the first and second distortion values and a sum of the third and fourth distortion values; and
    coding the current block using the preferred coding mode.

5. The method of claim 1, wherein:
    the pixelwise linear combination of the first and second transformed data comprises a sum of the first transformed data multiplied by a first scaling factor and the second transformed data multiplied by a second scaling factor,
    the deriving of the first reconstructed pixel data comprises designating the reconstructed joint pixel data multiplied by a third scaling factor as the first reconstructed pixel data, and
    the deriving of the second reconstructed pixel data comprises designating the reconstructed joint pixel data multiplied by a fourth scaling factor as the second reconstructed pixel data.

6. The method of claim 5, further comprising:
    determining values of the first, second, third and fourth scaling factors by selecting a preferred sub-mode among a plurality of predefined sub-modes, each of the plurality of predefined sub-modes defining a respective set of values of the first, second, third and fourth scaling factors.

7. The method of claim 6, wherein:
    the transforming of the first pixel data comprises performing a horizontal transform on each row of the first pixel data to generate first horizontally transformed data,
    the transforming of the first pixel data further comprises performing a vertical transform on each column of the first horizontally pixel data to generate the first transformed data,
    the transforming of the second pixel data comprises performing the horizontal transform on each row of the second pixel data to generate second horizontally transformed data,
    the transforming of the second pixel data further comprises performing the vertical transform on each column of the second horizontally pixel data to generate the second transformed data, and
    the selecting of the preferred sub-mode comprises calculating, for each of the plurality of predefined sub-modes, a respective distortion value based on the first horizontally transformed pixel data, the second horizontally transformed pixel data, and the set of values of the first, second, third and fourth scaling factors defined in the respective predefined sub-mode.

8. The method of claim 1, wherein the transforming of the first and second pixel data comprises transforming the first and second pixel data using Discrete Cosine Transform (DCT) or Discrete Cosine Transform Type II (DCT-2).

9. The method of claim 1, wherein each of the first and second distortion values comprises a sum of squared differences (SSD) or a sum of absolute differences (SAD).

10. A method of processing a current block of a picture of a video, comprising:
receiving first pixel data and second pixel data, each of the first and second pixel data comprising data of the current block in a spatial domain;
transforming the first pixel data to first transformed data and the second pixel data to second transformed data, each of the first and second transformed data comprising data in a frequency domain;
generating joint pixel data comprising a pixelwise linear combination of the first and second transformed data;
generating reconstructed joint pixel data in the spatial domain based on the joint pixel data by a quantization operation followed by an inverse quantization operation followed by an inverse transform operation;
deriving first reconstructed pixel data and second reconstructed pixel data based on the reconstructed joint pixel data, each of the first and second reconstructed pixel data comprising data in the spatial domain;
calculating a first distortion value based on the first pixel data and the first reconstructed pixel data; and
calculating a second distortion value based on the second pixel data and the second reconstructed pixel data.

11. An apparatus, comprising:
a transform module configured to transform first pixel data in a spatial domain to first transformed data in a frequency domain and second pixel data in the spatial domain to second transformed data in the frequency domain;
a scaling module configured to generate joint pixel data comprising a pixelwise linear combination of the first and second transformed data;
a quantization module configured to quantize the joint pixel data into quantized joint pixel data;
an inverse quantization module configured to de-quantize the quantized joint pixel data into reconstructed joint pixel data;
an inverse scaling module configured to derive first reconstructed pixel data and second reconstructed pixel data based on the reconstructed joint pixel data; and
a distortion evaluation module configured to calculate a first distortion value based on the first transformed data and the first reconstructed pixel data and a second distortion value based on the second transformed data and the second reconstructed pixel data.

12. The apparatus of claim 11, wherein:
the first pixel data comprises residual data of a first chroma component of the current block, and
the second pixel data comprises residual data of a second chroma component of the current block.

13. The apparatus of claim 11, wherein:
the quantization module is further configured to quantize the first transformed pixel data into first transformed-and-quantized pixel data and the second transformed pixel data into second transformed-and-quantized pixel data,
the inverse quantization module is further configured to de-quantize the first transformed-and-quantized pixel data into third reconstructed pixel data and the second transformed-and-quantized pixel data into fourth reconstructed pixel data, and
the distortion evaluation module is further configured to calculate a third distortion value based on the first transformed data and the third reconstructed pixel data and a fourth distortion value based on the second transformed data and the fourth reconstructed pixel data.

14. The apparatus of claim 13, wherein the distortion evaluation module is further configured to determine a preferred coding mode by comparing a sum of the first and second distortion values and a sum of the third and fourth distortion values.

15. The apparatus of claim 11, wherein:
the pixelwise linear combination of the first and second transformed data comprises a sum of the first transformed data multiplied by a first scaling factor and the second transformed data multiplied by a second scaling factor,
the first reconstructed pixel data comprises the reconstructed joint pixel data multiplied by a third scaling factor, and
the second reconstructed pixel data comprises the reconstructed joint pixel data multiplied by a fourth scaling factor.

16. The apparatus of claim 15, further comprising:
a preselection module configured to determine values of the first, second, third and fourth scaling factors by selecting a preferred sub-mode among a plurality of predefined sub-modes, each of the plurality of predefined sub-modes defining a respective set of values of the first, second, third and fourth scaling factors.

17. The apparatus of claim 16, wherein:
the transform module is configured to transform the first pixel data to the first transformed data by performing a horizontal transform on each row of the first pixel data to generate first horizontally transformed data followed by performing a vertical transform on each column of the first horizontally pixel data to generate the first transformed data,
the transform module is further configured to transform the second pixel data to the second transformed data by performing the horizontal transform on each row of the second pixel data to generate second horizontally transformed data followed by performing the vertical transform on each column of the second horizontally pixel data to generate the second transformed data, and
the selecting of the preferred sub-mode comprises calculating, for each of the plurality of predefined sub-modes, a respective distortion value based on the first horizontally transformed pixel data, the second horizontally transformed pixel data, and the set of values of the first, second, third and fourth scaling factors defined in the respective predefined sub-mode.

18. The apparatus of claim 11, wherein the transform module is configured to transform the first and second pixel data to the first and second transformed data using Discrete Cosine Transform (DCT) or Discrete Cosine Transform Type II (DCT-2).

19. The apparatus of claim 11, wherein each of the first and second distortion values comprises a sum of squared differences (SSD) or a sum of absolute differences (SAD).

20. The apparatus of claim 11, wherein the reconstructed joint pixel data is frequency-domain reconstructed joint pixel data, the apparatus further comprising:
an inverse transform module configured to transform the frequency-domain reconstructed joint pixel data to spatial-domain reconstructed joint pixel data,
wherein the inverse scaling module is further configured to derive fifth reconstructed pixel data and sixth reconstructed pixel data based on the spatial-domain reconstructed joint pixel data, and wherein the distortion evaluation module is further configured to calculate a fifth distortion value based on the first pixel data and the fifth reconstructed pixel data and a sixth distortion value based on the second pixel data and the sixth reconstructed pixel data.

* * * * *